United States Patent
Woods et al.

(10) Patent No.: US 8,705,131 B2
(45) Date of Patent: Apr. 22, 2014

(54) BIT MASK GENERATION SYSTEM

(75) Inventors: Michael Ian Woods, Wantage (GB);
Judy Booth, Oxford (GB)

(73) Assignee: Software Imaging Technology Limited, Oxford (GB)

(*) Notice: Subject to any disclaimer, the term of this patent is extended or adjusted under 35 U.S.C. 154(b) by 2664 days.

(21) Appl. No.: 11/200,798

(22) Filed: Aug. 10, 2005

(65) Prior Publication Data

US 2006/0082829 A1    Apr. 20, 2006

(30) Foreign Application Priority Data

Oct. 18, 2004 (GB) .................................. 0423105.6

(51) Int. Cl.
*H04N 1/40* (2006.01)

(52) U.S. Cl.
USPC ............................ 358/3.01; 358/1.9; 382/283

(58) Field of Classification Search
USPC ........ 358/518, 3.23, 530, 523–525, 1.13, 1.1, 358/1.14, 1.15, 1.9; 710/1, 105, 15, 62; 700/169, 175, 108, 110; 709/217, 224, 709/223, 249, 238
See application file for complete search history.

(56) References Cited

U.S. PATENT DOCUMENTS

| | | | |
|---|---|---|---|
| 4,805,033 A | 2/1989 | Nishikawa | |
| 4,920,501 A | 4/1990 | Sullivan | |
| 5,051,844 A | 9/1991 | Sullivan | |
| 5,214,517 A | 5/1993 | Sullivan | |
| 5,555,102 A | 9/1996 | Dalton | |
| 5,598,204 A | 1/1997 | Harrington | |
| 5,638,188 A | 6/1997 | Moro et al. | |
| 5,673,121 A | 9/1997 | Wang | |
| 5,761,325 A | 6/1998 | Barton | |
| 5,822,469 A | 10/1998 | Silverstein | |

(Continued)

FOREIGN PATENT DOCUMENTS

| | | |
|---|---|---|
| EP | 0504903 | 3/1992 |
| EP | 0734 149 | 9/1996 |

(Continued)

OTHER PUBLICATIONS

B. E. Bayer, *An Optimum Method for Two-Level Rendition of Continuous-Tone Pictures*, International Conference on Communications, vol. 1, pp. 26-11-26-15 (1973).

(Continued)

*Primary Examiner* — Firmin Backer
*Assistant Examiner* — Brendan McCommas
(74) *Attorney, Agent, or Firm* — Schwegman, Lundberg & Woessner, P.A.

(57) ABSTRACT

A system for generating a set of bit masks arrays is provided (350-0 to 350-255) where the bit mask arrays (350-0 to 350-255) are such that clusters of entries of different types are spread across each array and entries of different types within the arrays are either part of a larger cluster of entries of that type or are immediately adjacent to a cluster of entries of that type. When a multi-level image (200) is converted to a half-tone image (300) utilizing the bit mask arrays (350-0 to 350-255) a half-tone image (300) which limits the occurrence of small isolated printed or unprinted areas is generated. The bit mask arrays (350-0 to 350-255) are therefore particularly suitable for use with laser printers (28,32) which have difficulty rendering half tone images which comprise small isolated printed and unprinted areas.

42 Claims, 22 Drawing Sheets

(56) References Cited

U.S. PATENT DOCUMENTS

| | | | |
|---|---|---|---|
| 5,956,157 A | 9/1999 | Tai | |
| 5,978,556 A | 11/1999 | Wang | |
| 5,987,219 A | 11/1999 | Naylor, Jr. et al. | |
| 6,118,935 A | 9/2000 | Samworth | |
| 6,597,813 B1 | 7/2003 | Stanich et al. | |
| 6,791,718 B1* | 9/2004 | Allebach et al. | 358/3.13 |
| 6,864,996 B1* | 3/2005 | Fujita | 358/3.13 |
| 7,239,429 B2* | 7/2007 | Huang et al. | 358/3.06 |
| 7,372,594 B1* | 5/2008 | Kusakabe et al. | 358/1.9 |
| 2002/0150276 A1* | 10/2002 | Chang | 382/100 |
| 2003/0107768 A1* | 6/2003 | Crounse | 358/3.3 |

FOREIGN PATENT DOCUMENTS

| | | | |
|---|---|---|---|
| EP | 1 241 865 A2 | 9/2002 | H04N 1/40 |
| EP | 1 282 107 | 2/2003 | |
| GB | 1468741 | 3/1974 | |
| GB | 2352 579 | 1/2001 | |
| JP | 56123174 | 9/1981 | |
| JP | 3187573 | 8/1991 | |
| WO | WO/99/45697 | 9/1999 | H04N 1/40 |

OTHER PUBLICATIONS

Robert W. Floyd and Louis Steinburg, *An Adaptive Algorithm for Spatial Greyscale*, Proc. SID, vol. 17(2), pp. 75-77 (1976).

R. L. Stevenson and G. R. Arce, *Binary display of hexagonally sampled continuous-tone images*, Journal of the Optical Society of America A, vol. 2(7), pp. 1009-1013 (1985).

Reiner Eschbach and Keith T. Knox, *Error-diffusion algorithm with edge enhancement*, Journal of the Optical Society of America A, vol. 8(2), pp. 1844-1850 (1991).

J. Sullivan, L. Ray and R. Miller, *Design of Minimum Visual Modulation Halftone Patterns*, IEEE Transactions on Systems, Man and Cybernetics, vol. 21(1), pp. 33-38 (1991).

Theophano Mitsa and Kevin J. Parker, *Digital halftoning technique using a blue-noise mask*, Journal of the Optical Society of America A, vol. 9(11), pp. 1920-1929 (1992).

Robert Ulichney, *The void-and-cluster method for dither array generation*, Human Vision, Visual Processing and Digital Display IV, Proc. SPIE, vol. 1913, pp. 332-343 (1993).

Kevin E. Spaulding, Rodney L. Miller and Jay Schildkraut, *Recent Progress in Digital Halftoning II*, IS&T, Springfield, VA, 1999, pp. 225-247.

Ancin, Hakan et al., "New void-and-cluster method for improved halftone uniformity," Journal of Electronic Imaging, vol. 8(1), pp. 104-111, Jan. 1999.

Atkins, Clayton Brian et al., "Halftone postprocessing for improved rendition of highlights and shadows," Journal of Electronic Imaging, vol. 9(2), pp. 151-158, Apr. 2000.

\* cited by examiner

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 1 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

*FIG. 9A*

| 0.35 | 0.44 | 0.50 | 0.44 | 0.35 | 0.27 | 0.22 | 0.20 | 0.16 | 0.13 |
|---|---|---|---|---|---|---|---|---|---|
| 0.44 | 0.50 | 1.0 | 0.50 | 0.44 | 0.31 | 0.24 | 0.20 | 0.16 | 0.14 |
| 0.50 | 1.0 | 100.0 | 1.0 | 0.50 | 0.33 | 0.25 | 0.20 | 0.16 | 0.14 |
| 0.44 | 0.50 | 1.0 | 0.50 | 0.44 | 0.31 | 0.24 | 0.20 | 0.16 | 0.14 |
| 0.35 | 0.44 | 0.50 | 0.44 | 0.35 | 0.27 | 0.22 | 0.19 | 0.16 | 0.13 |
| 0.27 | 0.31 | 0.33 | 0.31 | 0.27 | 0.23 | 0.20 | 0.17 | 0.15 | 0.0 |
| 0.20 | 0.24 | 0.25 | 0.24 | 0.22 | 0.20 | 0.18 | 0.15 | 0.14 | 0.0 |
| 0.17 | 0.20 | 0.20 | 0.20 | 0.20 | 0.17 | 0.15 | 0.14 | 0.0 | 0.0 |

*FIG. 9B*

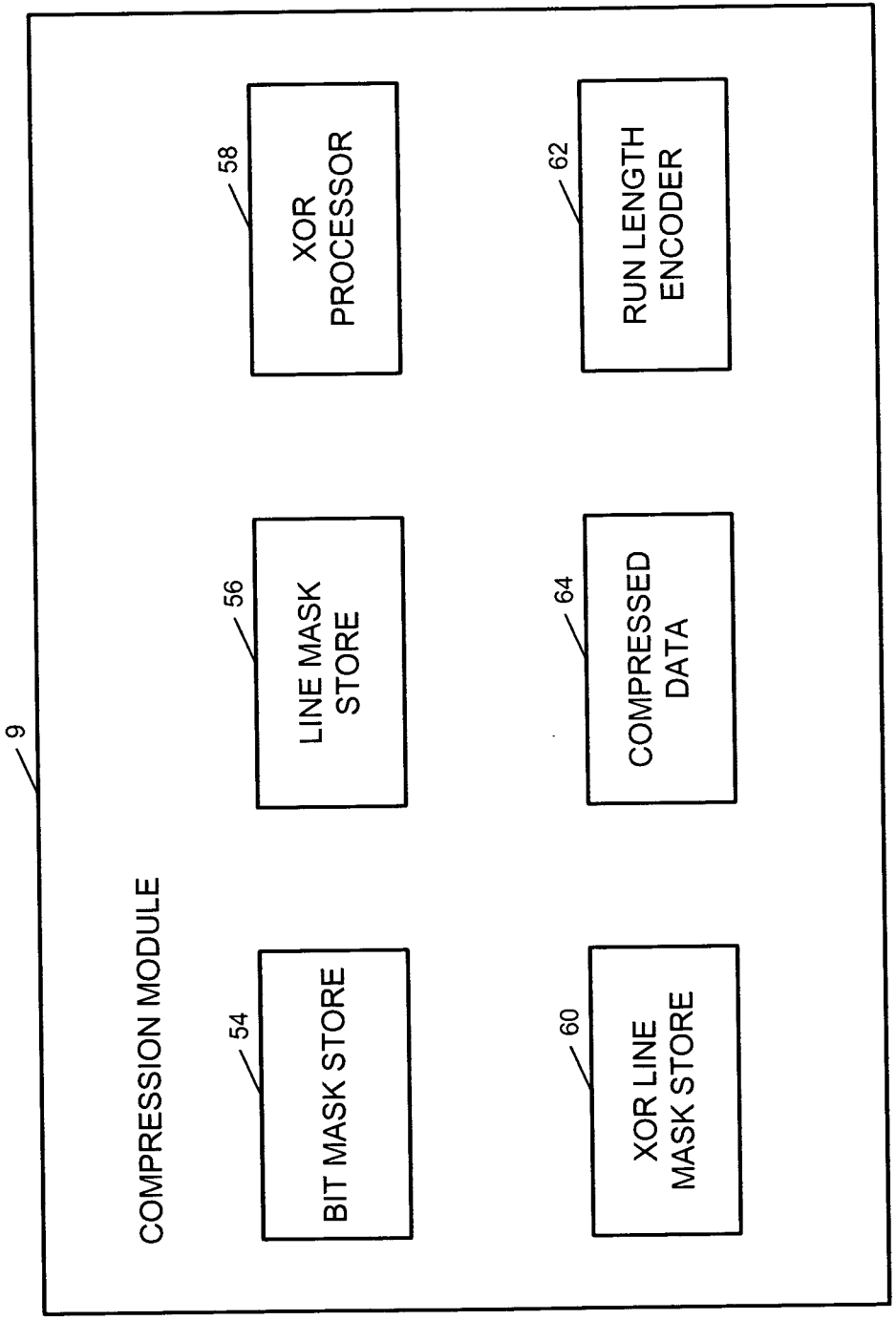

FIG. 13A

INCREASING LEVEL ↓

| 1 | 1 | 1 | 1 | 1 | 1 | 1 | 1 | 1 | 1 | 1 |
|---|---|---|---|---|---|---|---|---|---|---|
| 1 | 1 | 1 | 1 | 1 | 0 | 1 | 1 | 1 | 0 | 1 |
| 1 | 1 | 1 | 1 | 1 | 0 | 1 | 1 | 1 | 0 | 1 |
| 1 | 1 | 1 | 1 | 0 | 1 | 1 | 1 | 1 | 0 | 0 |
| 0 | 1 | 0 | 1 | 0 | 1 | 1 | 1 | 1 | 0 | 0 |
| 0 | 0 | 0 | 1 | 0 | 1 | 1 | 1 | 1 | 0 | 0 |
| 0 | 0 | 0 | 1 | 0 | 1 | 0 | 1 | 1 | 0 | 0 |

FIG. 13B

INCREASING LEVEL ↓

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 1 | 0 | 0 | 0 | 1 | 0 |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 1 |
| 1 | 0 | 1 | 0 | 0 | 0 | 0 | 0 | 0 | 0 | 0 |
| 0 | 1 | 0 | 0 | 0 | 0 | 0 | 0 | 0 | 0 | 0 |
| 0 | 0 | 0 | 0 | 0 | 0 | 1 | 0 | 0 | 0 | 0 |

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 1 | 0 | 0 | 0 | 1 | 0 |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 1 |
| 1 | 0 | 1 | 0 | 0 | 0 | 0 | 0 | 0 | 0 | 0 |
| 0 | 1 | 0 | 0 | 0 | 0 | 0 | 0 | 0 | 0 | 0 |
| 0 | 0 | 0 | 0 | 0 | 0 | 1 | 0 | 0 | 0 | 0 |

INCREASING LEVEL ↓

*FIG. 16B*

| 1 | 1 | 1 | 1 | 1 | 1 | 1 | 1 | 1 | 1 | 1 |
|---|---|---|---|---|---|---|---|---|---|---|
| 1 | 1 | 1 | 1 | 1 | 0 | 1 | 1 | 1 | 0 | 1 |
| 1 | 1 | 1 | 1 | 1 | 0 | 1 | 1 | 1 | 0 | 1 |
| 1 | 1 | 1 | 1 | 0 | 1 | 1 | 1 | 1 | 0 | 0 |
| 0 | 1 | 0 | 1 | 0 | 1 | 1 | 1 | 1 | 0 | 0 |
| 0 | 0 | 0 | 1 | 0 | 1 | 1 | 1 | 1 | 0 | 0 |
| 0 | 0 | 0 | 1 | 0 | 1 | 0 | 1 | 1 | 0 | 0 |

INCREASING LEVEL ↓

*FIG. 16C*

|   | 1 | 2 | 3 | 4 | 5 | 6 | 7 | 8 |
|---|---|---|---|---|---|---|---|---|
| 1 | 154 | 153 | 153 | 154 | 153 | 154 | 20 | 15 |
| 2 | 154 | 152 | 152 | 22 | 21 | 20 | 20 | 10 |
| 3 | 253 | 225 | 15 | 35 | 15 | 35 | 20 | 5 |
| 4 | 252 | 250 | 15 | 35 | 35 | 15 | 30 | 15 |

INCREASING X COORDINATE

|   | 1 | 2 | 3 | 4 | 5 | 6 | 7 | 8 |
|---|---|---|---|---|---|---|---|---|
| 1 | 0 | 1 | 1 | 0 | 1 | 1 | 0 | 0 |
| 2 | 0 | 0 | 1 | 1 | 1 | 1 | 1 | 0 |
| 3 | 0 | 0 | 1 | 1 | 1 | 1 | 1 | 1 |
| 4 | 0 | 0 | 1 | 1 | 0 | 0 | 1 | 1 |

*FIG. 20*

BIT MASK GENERATION SYSTEM

CLAIM OF PRIORITY

This application claims priority to patent application 0423105.6, filed in the U.K. on Oct. 18, 2004, the contents of which are herein incorporated by reference in their entirety.

The present invention relates to image processing. More specifically the present invention relates to the conversion of multi-level images into half-tone images and the printing of such images using a laser printer.

Representing shades of color in a printed image has long been a problem for printers. Although display devices such as cathode ray tubes and LCD displays can often generate images with varying intensities of color and shades of grey, most laser printers are only able to either deposit toner on the page or not. In order to represent intermediate shades in a printed image it is therefore necessary to convert a multi-level image into one where shades are represented by a mixture of printed and non-printed areas.

Converting multi-level images into images where shades are represented by a combination of printed and non-printed areas is known as half-toning. A number of approaches to half-toning are known.

One known method is error diffusion. The basic concept of error diffusion is that when a pixel having a grey level value (for example a value ranging between 0 representing black and 255 representing white) is to be printed the grey level value is compared with a threshold. If the grey level value does not exceed the threshold a dot is printed. If the grey level value exceeds the threshold no dot is printed. An error value being the difference between the grey level value of an original image and the grey level value (either 0 or 255) actually represented in the printed image is then calculated. A proportion of this error is then added or subtracted from the grey level values for a number of neighboring pixels.

Although half-toning using error diffusion generally creates high quality images, error diffusion does have a number of drawbacks. Firstly error diffusion requires a number of calculations to take place for each pixel as error values are added or subtracted to adjacent pixels. The relatively high computational requirements therefore mean that half-toning using error diffusion is generally relatively slow.

Further there are some grey levels for example 25%, 33% and 50% which can cause particular problems when half-toning using error diffusion. For example a typical pattern for a 50% grey level is a checkerboard pattern. However error diffusion can occasionally result in the generation of rows or columns of dots instead of a checkerboard pattern of dots. Such artifacts which arise from the generation of rows and columns are then discernable in the final output image.

In order to overcome the drawbacks of error diffusion a number of alternative methods have been proposed. One proposal is the use of a threshold array or dither matrix. In such a system an array of fixed threshold numbers is generated which is tessellated across an image to be processed. At any pixel co-ordinate, the grey level value of the image is compared with the corresponding value in the threshold array. Where the grey level value for an image is less than that of the threshold array a pixel is printed. If the grey level value for the image is greater than the corresponding value in the threshold array no dot is printed. By arranging the threshold values in a threshold array in a particular manner results similar to error diffusion can be achieved. Examples of systems for generating suitable threshold arrays are disclosed in GB 2352579 and U.S. Pat. No. 5,726,772.

An alternative system to half-toning utilizing threshold arrays is a system utilizing bit masks. Whereas a threshold array consists of an array of threshold values ranging from for example 0 to 255, in a system using bit masks, 256 bit mask arrays are stored where each of the arrays consists of an arrangement of zeros and ones. The arrangement of zeros and ones in each bit mask is representative of an arrangement of dots representative of the grey level associated with the bit mask. Thus for example a bit mask for a grey level indicative of a light color would predominantly consist of an array containing zeros indicative of the absence of printing. In contrast a bit mask for a dark color would predominantly consist of ones.

When a multi-level image is to be converted utilizing a bit mask, initially the grey level value of an image pixel to be printed is utilized to select one of the stored bit masks. The x y co-ordinates for the pixel being printed are then utilized to identify one of the entries in the bit mask. This will either be a one or a zero with the ratio of ones and zeros for a particular bit mask depending on the level of grey scale the bit mask is intended to represent. Toner is deposited on the page if the identified bit mask entry is equal to one and no toner is deposited if the identified bit mask entry is equal to zero.

Printing utilizing bit masks has a notable advantage over systems which utilize threshold arrays. As a bit mask is stored for each of the grey levels which are to be represented the arrangement of dots which are printed for each grey level can be optimized so that the toner representing a particular shade of grey is distributed in a visually pleasing manner. That is to say each arrangement of toner can be carefully calculated so as to be perceived as a shade of color rather than a set of individual dots. Conventionally this is achieved by processing candidate dot arrangements to determine spatial frequencies for the arrangements. In order to achieve a pleasing appearance, arrangements having higher spatial frequencies rather than lower spatial frequencies are selected. This ensures that excessive clumping of dots which can give the impression of a pattern of dots rather than a shade of color can be reduced. An example of a conventional system for generating bit masks is disclosed in U.S. Pat. No. 4,920,501

Bit mask systems do, however, suffer from three disadvantages. When two similar shades of color are represented next to each other, it is desirable that the boundary between the two shades appears to be a blend of the shades. The optimization of the dot arrangements for the two levels however can result in there being a discernable boundary when the two portions of image are printed next to each other. This is because the spread of dots at the edge of one arrangement may be in positions which are close to the positions of dots in the arrangement for the other shade. Printing the different arrangements next to each other therefore can result in clumping of dots at the boundary between the two shades. This problem is known as contouring.

A second problem with bit masks arrays is that the amount of storage required for storing a single threshold array is significantly less than the amount of storage necessary to store a set of bit masks. Thus for example in the case of a 32 by 32 threshold array for threshold values ranging between 0 and 255, $2^{10}$ 8 bit numbers would need to be stored. In contrast in order to store data similar data representing 256, 32 by 32 bit masks, 32 times as much data would have to be stored.

A third problem arises specifically when printing images using a laser printer. In general the placement and rendering of single dots of toner by laser printers is very poor as when only a small area of charge is deposited on a print medium, frequently no toner will adhere at that spot. Similar problems exist when trying to maintain isolated holes in area to be covered with toner as the limitations in the accuracy of charge deposition tends to mean that toner will adhere across the entirety of such areas. The generation of bit mask which completely optimizes the spread of ones and zeros across the mask tends to result in images which are represented by many isolated dots of toner or unprinted areas and hence are poorly rendered by laser printers.

A bit mask based printing system is therefore required in which the arrangement of dots which are printed for each level can be optimized but which also alleviates these problems.

In accordance with one aspect of the present invention there is provided a bit mask generation system which enables sets of bit masks to be generated which reduce the occurrence of isolated dots appearing in output half-tone images.

In embodiments in accordance with this aspect of the present invention, a bit mask generation system is provided which balances the competing requirements of generating bit masks where one and zero entries are spread as evenly as possible across a bit mask so that the resultant bit mask is rendered to appear as a shade of grey rather than a distinct pattern of dots and a requirement that one and zero entries are grouped together within the bit mask to avoid having to render shades comprising patterns of isolated dots or unprinted areas which are poorly rendered by laser printers.

To this end, in accordance with this aspect, a bit mask generation system is provided which generates bit masks associated with light shades of grey which comprise a spread of clusters of one entries where each of the clusters is such to ensure that the cluster is sufficiently large to be reliably rendered by the laser printer for which the bit mask is generated. When the bit mask generation system determines that for mid range grey levels, the spread of entries in a bit mask can be improved by increasing the size of pre-existing clusters of one entries rather than adding new complete clusters to a mask, this approach is utilized to generate bit masks for successive shades of grey, providing that doing so does not result in the generation of excessively small clusters of zero entries. Finally, for the darkest shades of grey, the bit mask generation system determines bit mask arrays which comprise a spread of clusters of zero entries where each cluster is such to ensure that the cluster is reliably left unprinted by the laser printer for which the bit mask is generated.

In another aspect of the present invention a bit mask generation system is provided which enables bit masks to be generated which reduce contouring apparent between adjacent grey levels.

In embodiments in accordance with this aspect of the present invention, the bit mask generation system is such to generate bit mask where although the spread of one and zero entries is optimized for each level, the generation and optimization of bit masks is such that the number of entries in a bit mask which differ between bit masks for successive grey levels is less than a preset threshold.

In another aspect of the present invention a bit mask generation system is provided which enables bit masks to be generated which can be stored in a compressed fashion.

In embodiments in accordance with this aspect of the present invention, bit masks are generated in which much of the bit mask for a grey-level is copied to form part of the bit mask for the next successive level. The copying of areas of bit masks for successive grey levels is then exploited to generate compressed representations of the bit masks.

Further aspects and embodiments of the present invention will become apparent with reference to the specific embodiment described in the accompanying drawings in which.

Figure 2:
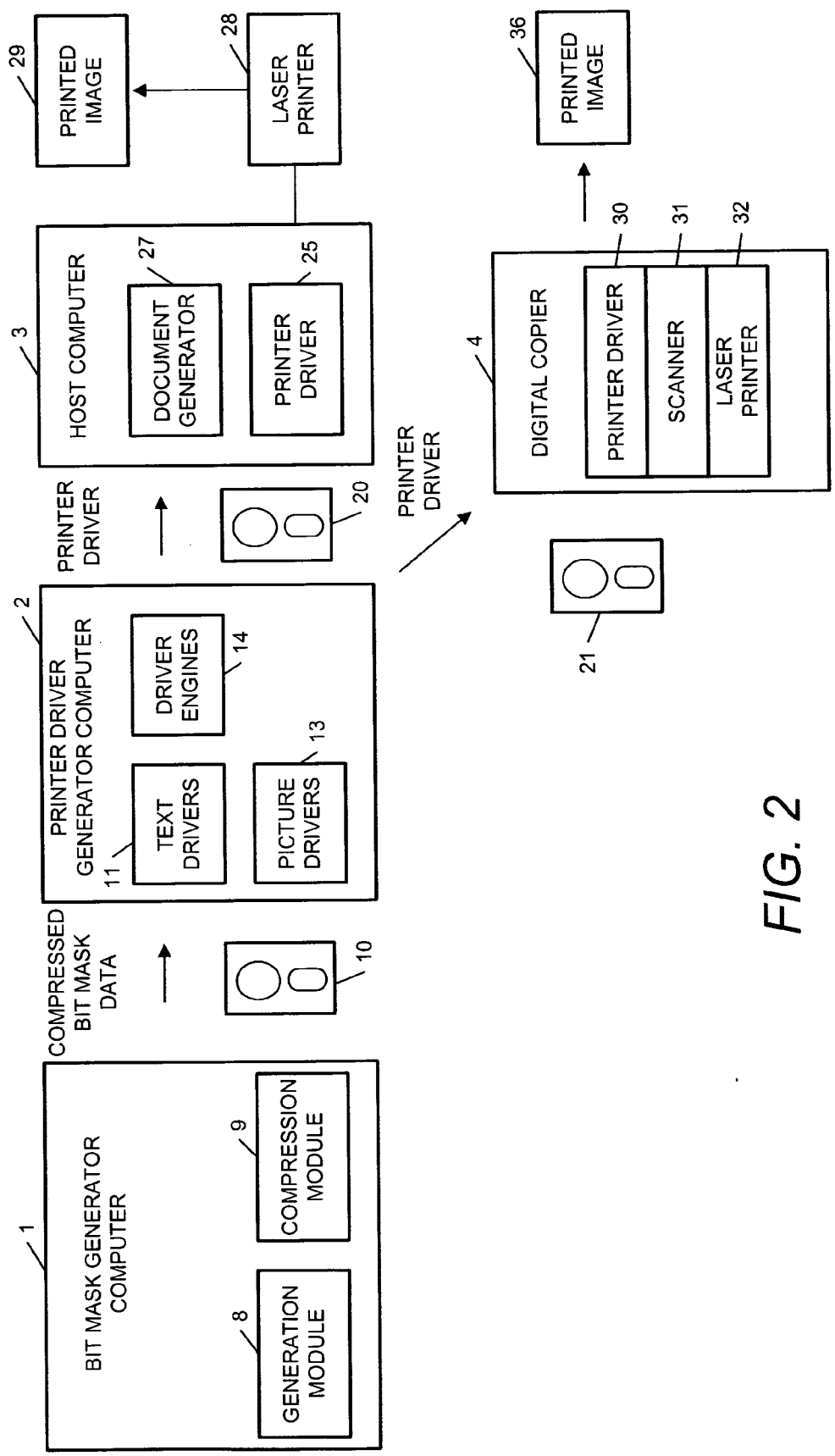
FIG. 2 is a block diagram illustrating in overview the components of a system for generating bit mask arrays, printer drivers and printed images in accordance with an embodiment the present invention.
Figure 3:
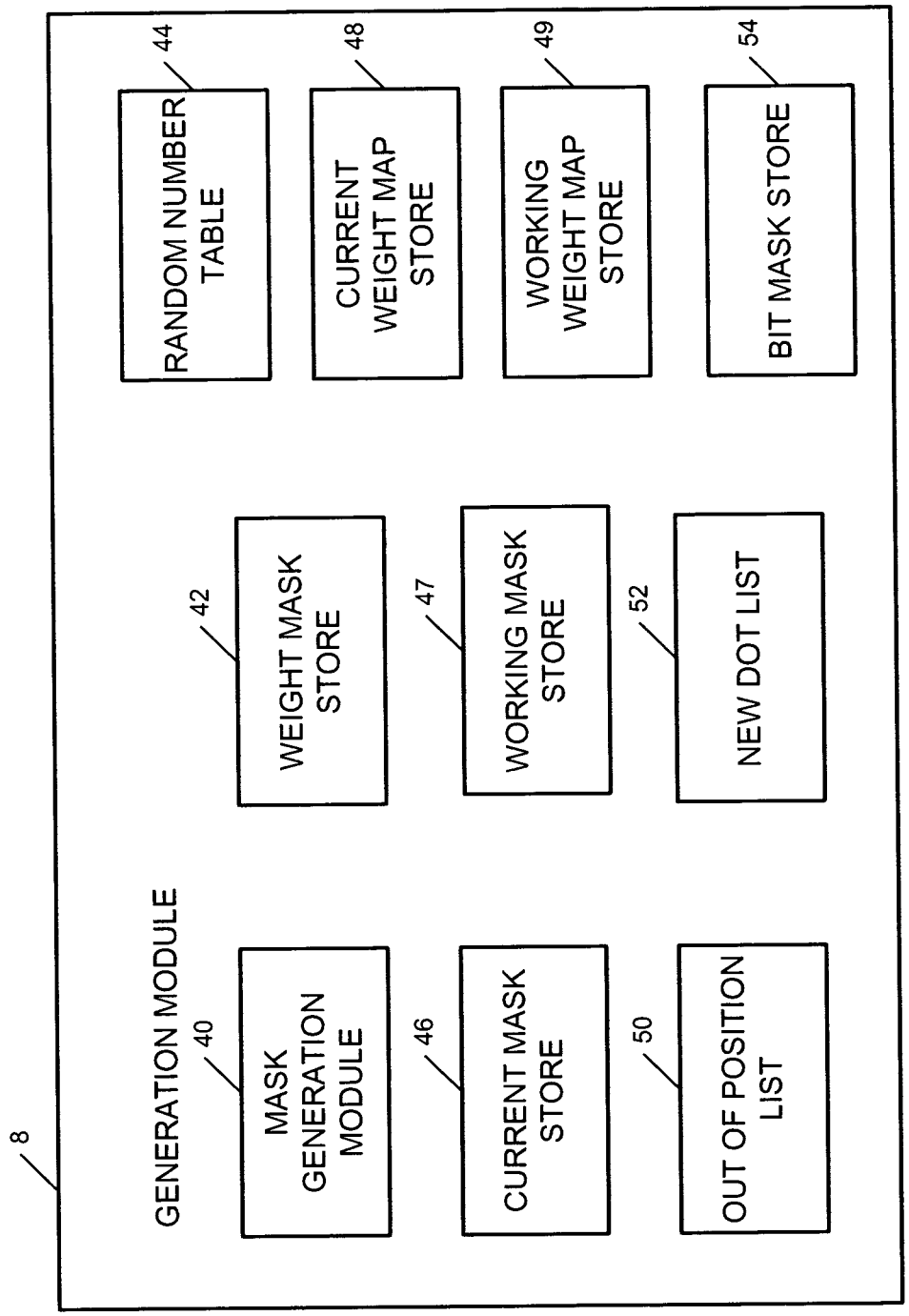
FIG. 3 is a block diagram of a generation module which forms part of a bit mask generator computer of the system of FIG. 2.
Figure 5:
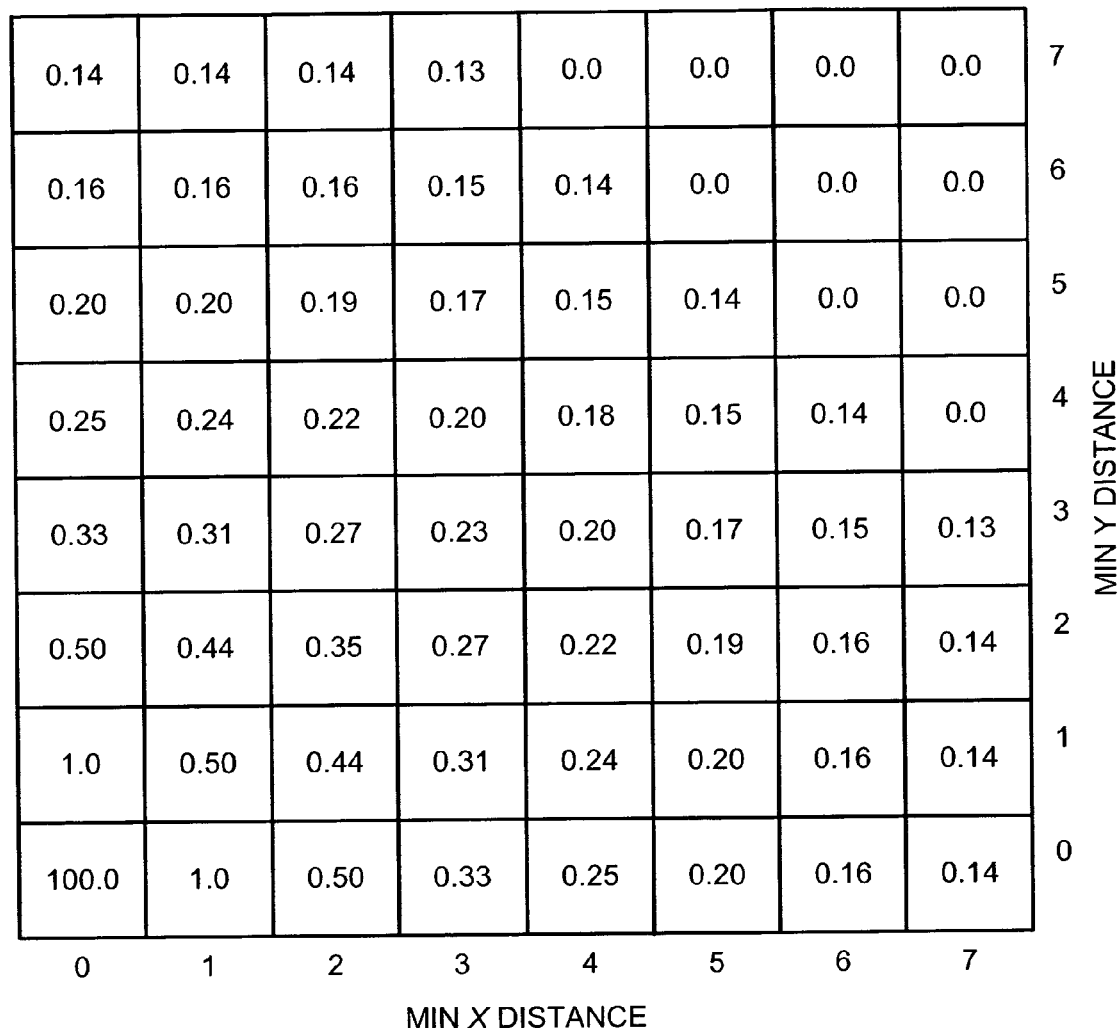
FIG. 5 is an illustrative example of a weight mask generated by the generation module of FIG. 3.
Figure 7:
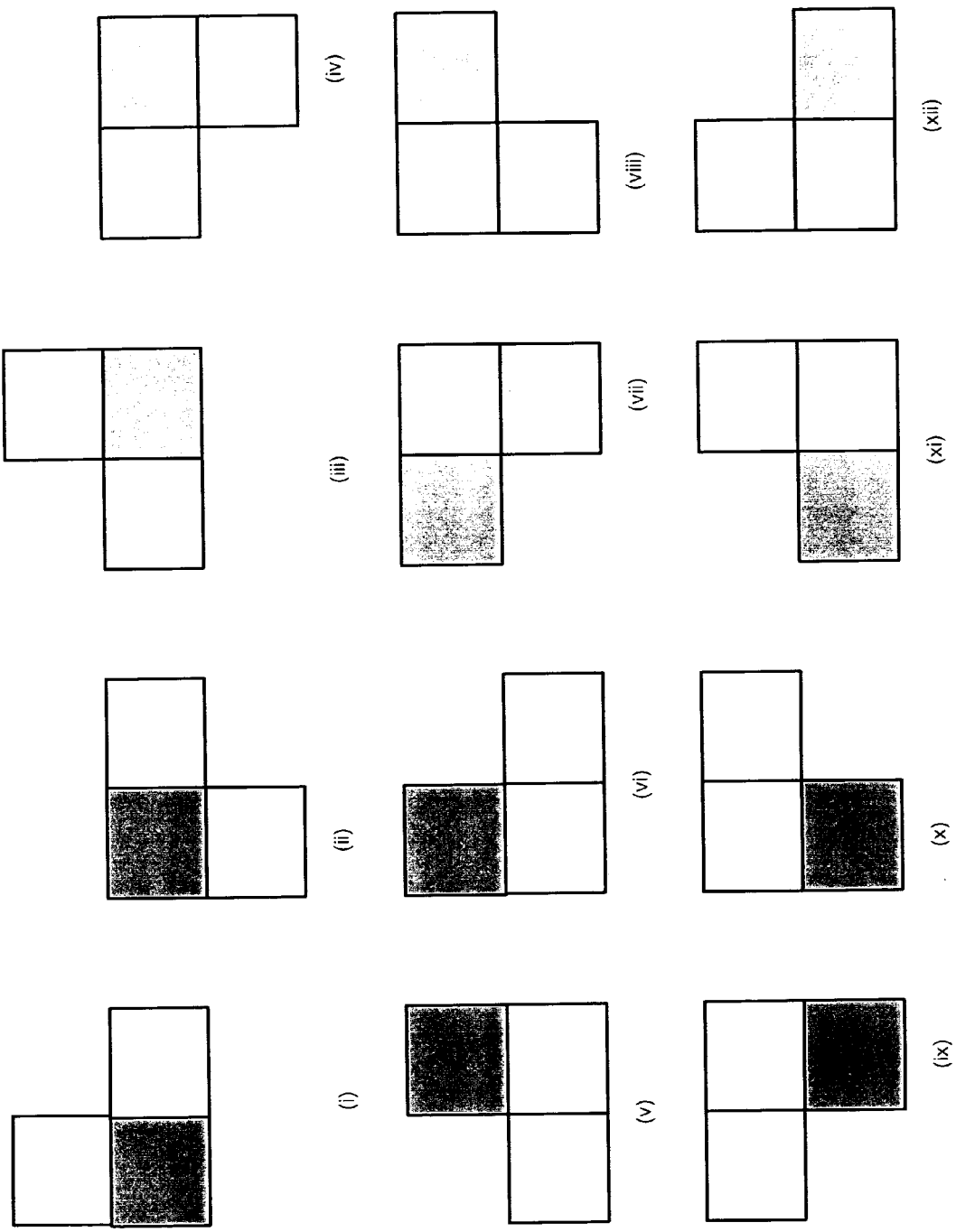
Figure 8:
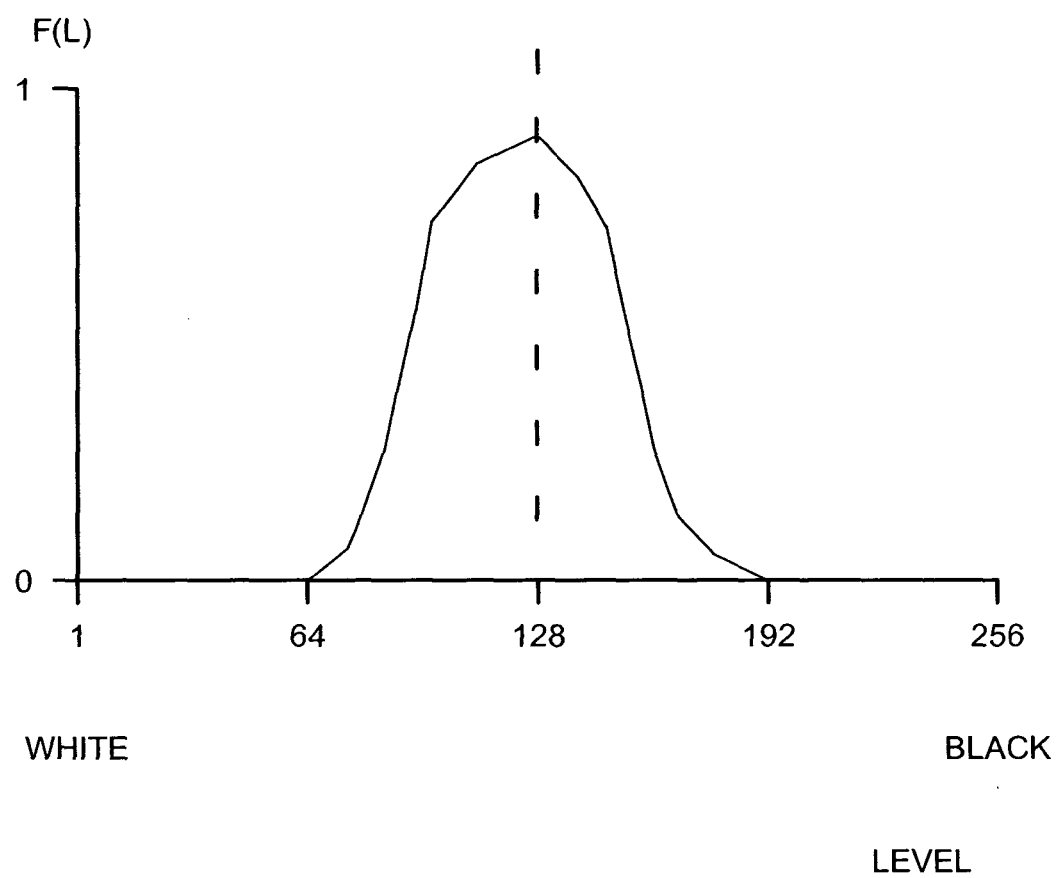
Figure 12:
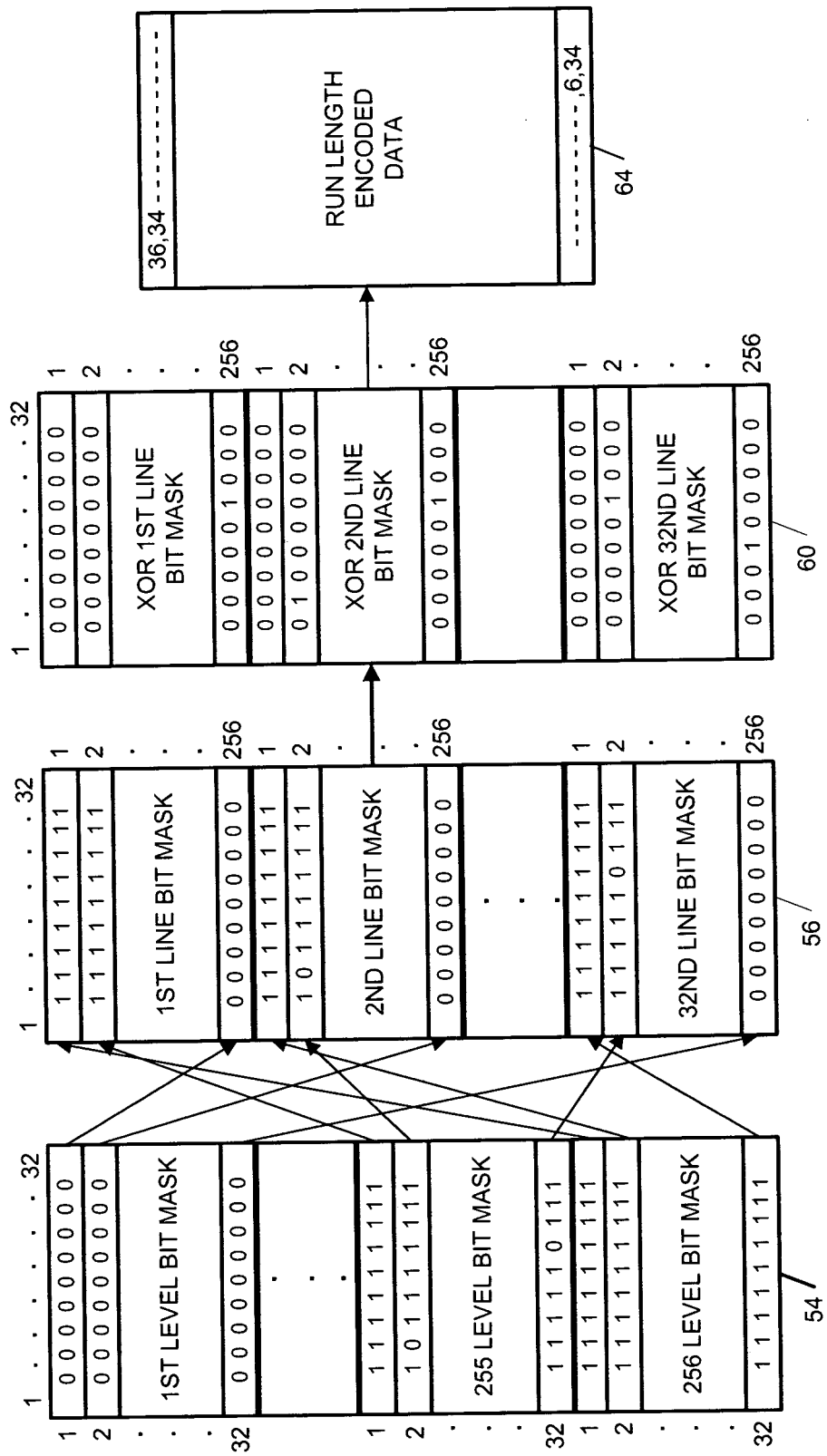
Figure 14:
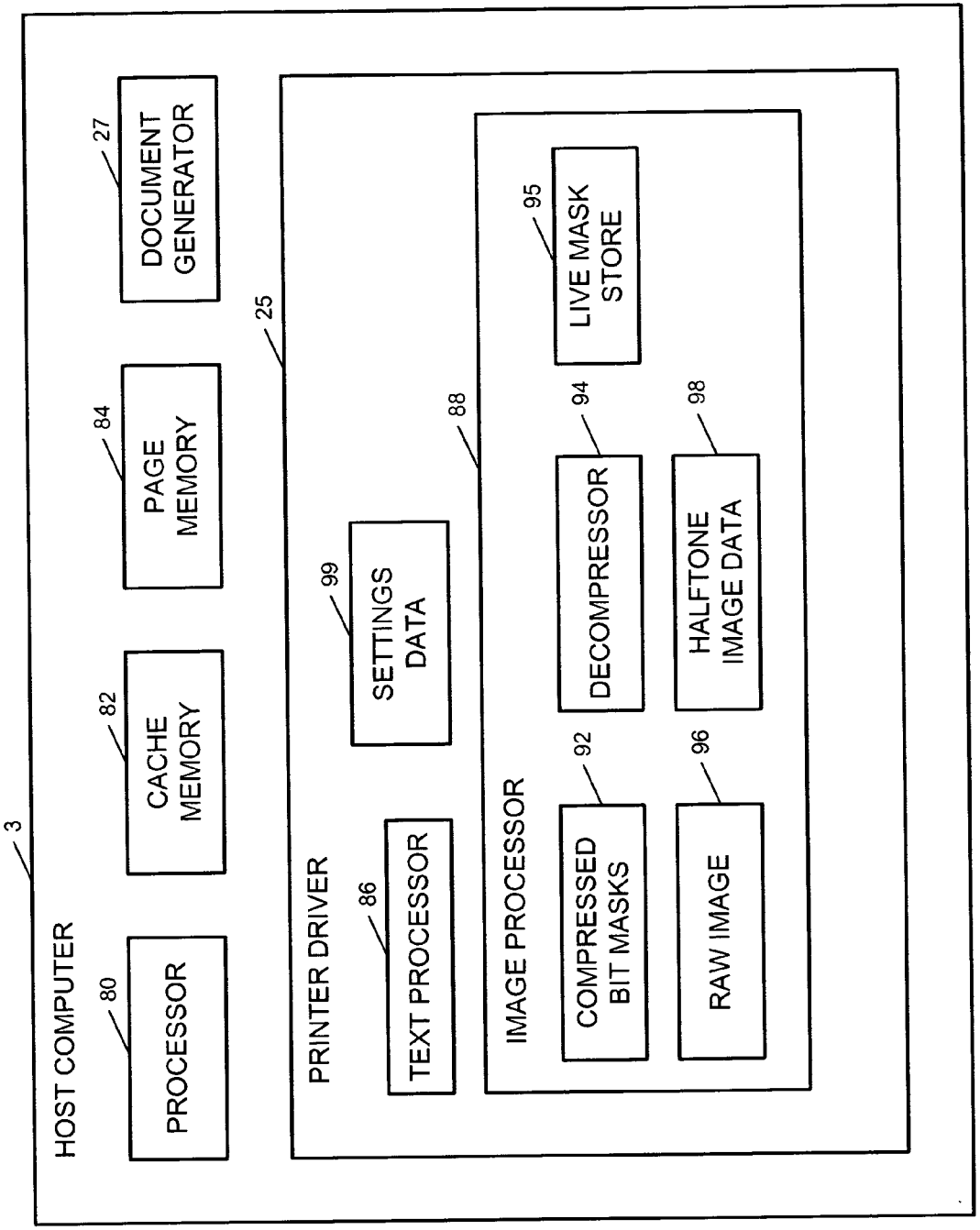
Figure 15:
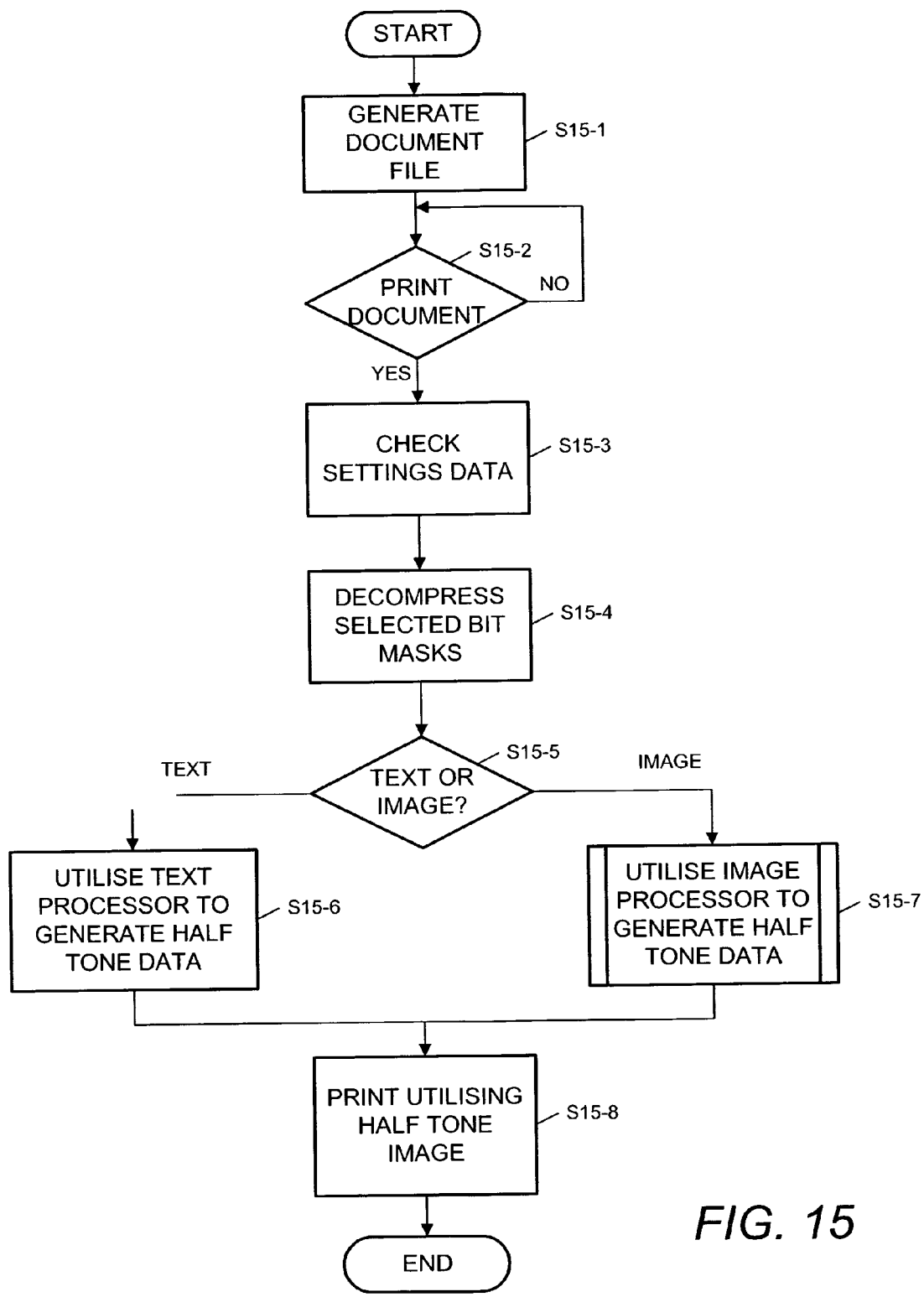
Figure 17:
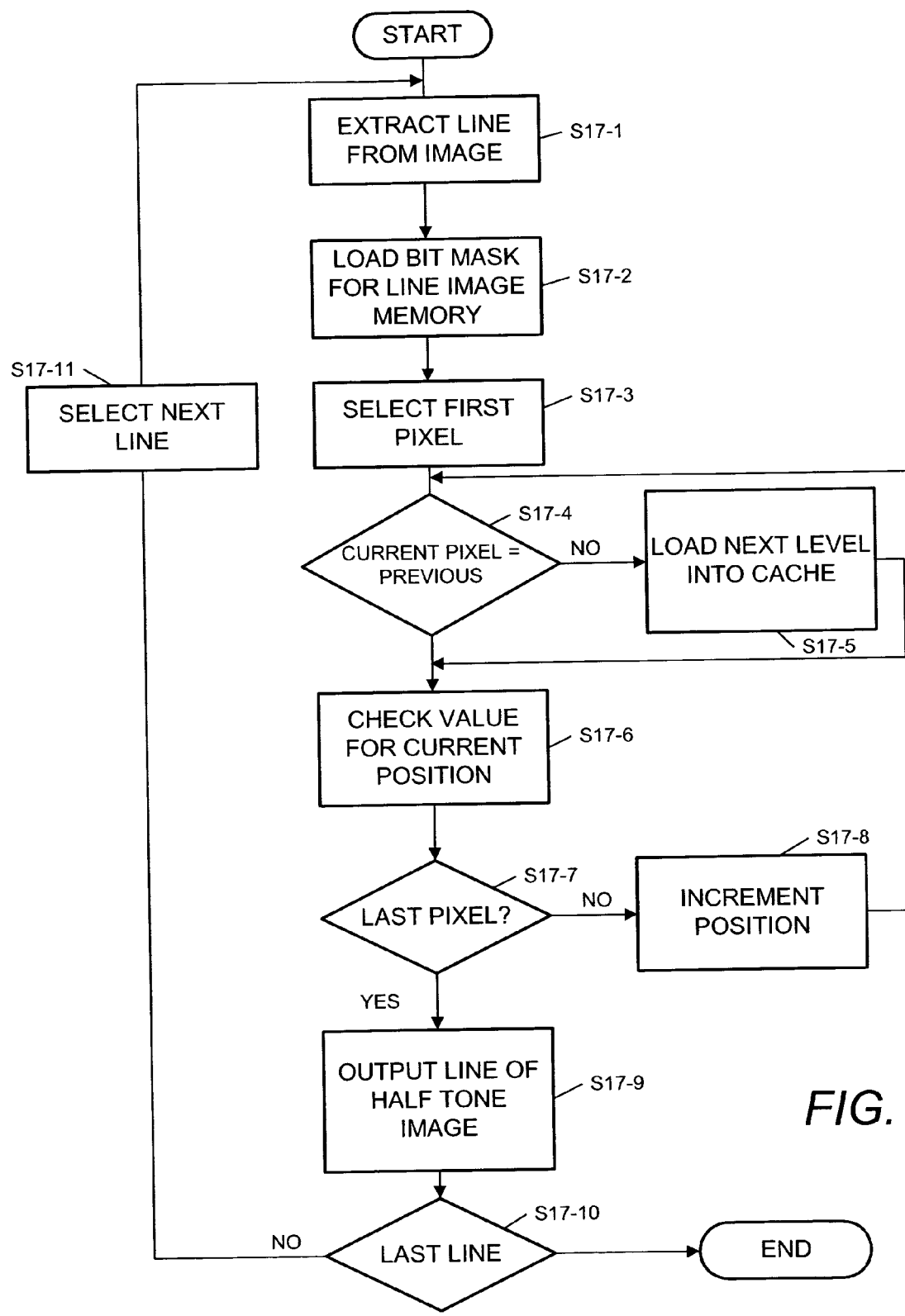
Figures 18, 19:
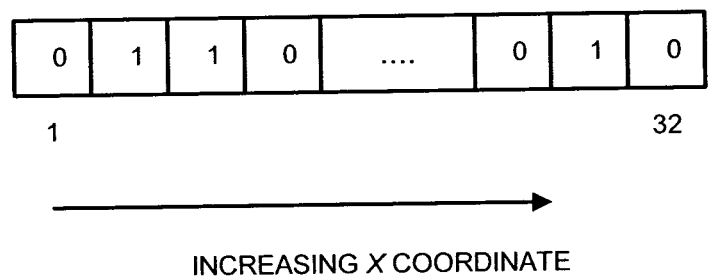

FIGS. 6 A&B are a flow diagram of processing to determine the positions of one or more one entries to be included in a bit mask array generated by the generation module of FIG. 3;

FIG. 7 is a schematic illustration of twelve valid cluster shapes for inclusion in bit masks;

FIG. 8 is a graph illustrating a function for varying the generation of weight maps for different levels of grey for which bit masks are to be generated;

FIG. 9A is an illustrative example of a zero entry being modified in an array of numbers representing a portion of a bit mask being generated;

FIG. 9B is an illustrative example of the increase in values of the weight map entries resulting from the update of a weight map utilizing the weight mask illustrated in FIG. 5 for modification of the array of numbers illustrated in FIG. 9A;

FIGS. 10 A-C are a flow diagram illustrating the processing of the generation module of FIG. 3 for modifying a bit mask;

FIG. 11 is a block diagram of a compression module which forms part of the bit mask generator computer of the system of FIG. 2;

FIG. 12 is block diagram illustrating the rearrangement of data to enable bit masks generated by the generation module of FIG. 3 to be compressed;

FIGS. 13A, 13B and 13C are an illustrative example of data representing bit masks being compressed;

FIG. 14 is a block diagram of a host computer which forms part of the system of FIG. 2 including a printer driver generated by the printer driver generator of FIG. 2;

FIG. 15 is a flow diagram of a printing process utilizing the printer driver of FIG. 14;

FIGS. 16A, 16B and 16C are an illustrative example of the decompression of data by the printer driver of FIG. 14;

FIG. 17 is a flow diagram of the generation of a half-tone image by the printer driver of the host computer of FIG. 14;

FIG. 18 is an illustrative example of an array of multi-level grey scale values representing a portion of an image;

FIG. 19 is an illustrative example of a portion of a bit mask utilized by the printer driver of the host computer of FIG. 14 to determine how to represent a pixel in an image to be printed; and FIG. 20 is an illustrative example of a portion of half-tone image generated by converting the array of grey scale values of FIG. 18.

OVERVIEW OF PRINTING SYSTEM UTILIZING BIT MASKS

An outline of printing using bit masks in accordance with the present invention will first be described with reference to FIGS. 1A and 1B.

Figures 1A, 1B:
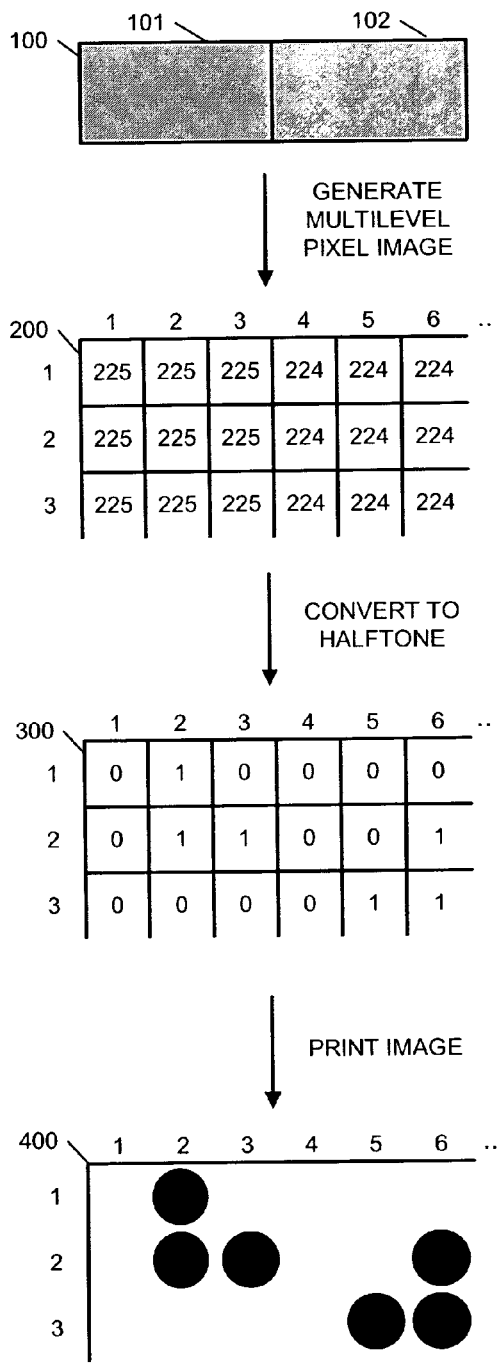
FIG. 1A is a schematic illustration of the steps involved in the printing utilizing a set of bit masks in accordance with an embodiment of the present invention.
FIG. 1B is a block diagram of a set of bit masks in accordance with the present invention stored within a memory.

FIG. 1A illustrates the steps involved in printing an image. A portion of an original image 100 which is to be printed is shown. In this example the portion 100 comprises two adjacent areas 101, 102 having similar but not identical shades of grey. Initially the original image 100 is stored in a computer memory as an array of multi-level pixels 200, where each of the pixels in the array has a value indicating the shade of the pixel in the original image. Thus in the case of the exemplary image 100 where the area 101 corresponds to shade 225 and area 102 corresponds to shade 224 an array of multi-level pixel data 200 shown in FIG. 1A would be stored.

When an image is to be printed the array of multi-level pixels 200 is used to generate an array of binary pixels 300 where each of the binary pixels in the array has a value of zero or one. The conversion of multi-level pixels 200 into binary pixels 300 is such that the proportion of multi-level pixels having a particular value which are converted into binary pixels having a value one decreases for pixels indicative of progressively lighter shades of grey. When an array of binary pixels 300 has been generated the binary pixel data 300 is then used to activate a laser printer to deposit toner for each pixel in the binary array 300 having a value one so as to generate an output image 400 comprising a pattern of printed and unprinted areas.

In order to set the value of binary pixels, a set of bit mask arrays is stored. FIG. 1B is an illustration of a memory 310 storing a set of 256 bit mask arrays 350-255 to 350-0, one for each of the levels of grey the multi-level pixels can represent. In FIG. 1B portions of the bit mask arrays for grey levels 255, 225, 224 and 0 are shown in detail.

As can be seen from FIG. 1B the bit mask array 350-0 associated with level 0 which is indicative of the color black consists of an array entirely filled with ones. Conversely the binary array 350-255 associated with level 225, indicative of the color white, consists of an array entirely filled with zeros. Intermediate bit mask arrays for intermediate grey values such as represented by levels 224 and 225 comprise bit mask arrays 350-224 and 350-225 having a mixture of one entries and zero entries where a number of one entries increases for arrays for successively darker shades of grey. When the value of a binary pixel is to be set, the value of the multi-level pixel corresponding to the binary pixel is used to select one of the stored bit mask arrays 350-255 to 350-0 stored in the memory 310. The co-ordinates of the multi-level pixel are then used to select an individual entry from the selected bit mask. The value of the selected entry, either a zero or a one, is then stored as the value for that binary pixel.

Comparing the array of binary pixels 300 of FIG. 1A with the bit mask arrays for levels 224 and 225 shown in FIG. 1B it can be seen that the effect of using the bit masks in this way is to copy portions of the bit mask arrays into the generated array of binary pixels 300. Thus the first three columns of the binary pixel array 300 which correspond to multi-level pixels having a value of 225 correspond to a copy of the first three columns of the bit mask array 350-225 for grey level 225. Similarly the next three columns of the binary array 300 which correspond to the multi-level pixels having a value of 224 correspond to a copy of the entries for the second three columns of numbers in the bit mask array 350-224 for grey level 224.

In order to generate visually pleasing images it is important that the arrangement of ones and zeros in the bit mask array for each grey level is such to provide a spread of toner so as to cause the resultant images to be perceived as shades of grey rather than individual patterns of dots. Where two adjacent areas of a printed image are of similar shades of grey it is also desirable that the boundary blends from one level of grey to the next. Optimization of the spread of dots for each level can however cause problems known as contouring when two different grey levels are represented next to each other in an image. This is because selecting entries from different arrays which themselves have been optimized to represent a spread of dots can result in clumping of dots or gaps at the boundary.

In accordance with the present invention a set of bit masks 350-0 to 350-255 is provided which alleviates this problem. This is achieved by having a set of bit masks where although each bit mask array is optimized to cause a spread of dots for representing a particular shade of grey, the optimization process is such that most of the entries of an array for one grey level are identical in the array for an adjacent grey level. This is shown in FIG. 1B by the similarities of the arrays for levels 224 and 225 where most of the entries in the bit mask array 350-225 for level 225 are identical to corresponding entries in the bit mask array 350-224 for level 224.

Additionally, in order to reduce the occurrence of isolated dots or holes having to be rendered in a final image, as will be described in detail, the generation of the bit masks is such to ensure that one and zero entries are grouped together in clusters in each bit mask so as to increase the reliability with which areas representing different shades are printed.

The optimization of bit masks for each level of grey ensures that the bit masks cause the generation of patterns of dots which are perceived as shades rather than clumps of dots. However since much of the bit mask of one level of grey corresponds to the bit mask for the next level of grey, arrangement of dots in a printed image along a boundary between areas of adjacent grey levels is also such that a visually pleasing spread of dots is achieved. Additionally by ensuring that large portions of a bit mask array in one level is identical to that in another, the set of bit mask arrays becomes highly suitable for compression as will be described in detail later.

System for Generating Bit Masks, Printer Drivers and Printed Images

A system for generating bit mask arrays, printer drivers incorporating the bit mask arrays in accordance with the present invention will now be described in detail with reference to FIG. 2.

As is well known printer drivers are software programs which control the operation of printers. Each printer manufacturer therefore requires a printer driver which is suitable for running their particular printer. To this end printer driver generation kits are created by printer driver manufacturing companies so that the individual printer manufacturers can select printer functions which are to be available in a particular printer and generate appropriate printer drivers.

Referring to FIG. 2, a bit mask generator computer 1 is provided for use by a printer driver manufacturer. The bit mask generator computer 1 is programmed to generate bit mask array data for incorporation in printer drivers. A printer driver generator computer 2 is then provided for use by a printer manufacturer. The printer driver generator computer 2 comprises a computer including a printer driver generation kit for creating printer drivers incorporating the bit mask array data generated by the bit mask array generator computer 1 finally generated printer drivers are loaded into the memories of host computers 3 and digital copiers 4 where the printer drivers utilize the data previously generated by the bit mask generator computer 1 to convert multi-level image data into half-tone image data which can then be printed.

As will be described in detail later the bit mask arrays generated by the bit mask generator computer 1 are such to cause patterns of dots generated for each grey level to be distributed in a visually pleasing arrangement. Further the generation is such that the dot patterns represented by bit mask arrays for different levels keep contouring which results when areas of different grey levels are printed adjacent to one another to an acceptable amount as significant portions of bit mask arrays for adjacent grey levels are identical. The generation is also such to reduce the occurrence of isolated dots or holes in a generated half-tone image making the image suitable for printing using a laser printer in which isolated dots or holes are not reliably printed.

In this embodiment, the bit mask generator computer 1 has stored within its memory a generation module 8 for generating sets of bit mask arrays representing the position of dots indicative of a range of grey levels to be printed and a compression module 9 for compressing generated data. When a set of bit masks have been generated by the generation module 8 they are passed to the compression module 9 which generates compressed bit mask data. The compressed bit mask data is then recorded on to a CD ROM 10 which is then passed to the printer driver generator computer 2.

The printer driver generator computer 2 reads the compressed data recorded on the CD ROM 10 and stores it in its memory. Additionally in the memory of the printer driver generator computer 2 are a set of text drivers 11, a set of picture drivers 13 and a set of driver engines 14.

The text drivers 11 comprise conventional printer driver text drivers for processing text data and converting text data into printer instructions for printing images corresponding to the text data. Similarly, the picture drivers 13 comprise image processing modules for processing image data and converting image data into printer instructions. The driver engines 14 comprise a library of functions for coordinating text drivers and printer drivers to convert documents into printer instructions.

In use, the printer driver generator computer 2 incorporates the compressed bit mask data read from a CD ROM 10 into selections of picture drivers 13 to be included in a printer driver which is being created. Data representing the selected picture drivers 13 and selected text drivers II and driver engines 14 is then recorded onto CD ROMS 20, 21 as printer drivers. The recorded printer drivers on the CD ROMS 20, 21 are then loaded into the memories of host computers 3 and digital copiers 4.

In the case of a host computer 3, data read from a CD ROM 20 recorded by the printer driver generator computer 2 is stored as a printer driver 25 in the memory of the host computer 3. Also stored in the memory of the host computer 3 are other programs including a document generator program 27 for example a word processing program. When document files generated by the document generator 27 are to be printed the printer driver 25 incorporating the compressed bit mask data previously generated by the bit mask generator computer 1 is invoked. The printer driver 25 then decompresses the compressed bit mask data and utilizes the decompressed bit mask data to generate half-tone image data which is then passed to a laser printer 28 attached to the host computer 3 which then prints an image 29.

In the case of printer drivers for digital copiers 4 generated by the printer driver generator 9, a CD ROM 21 having recorded on them data representing a generated printer driver is read from the CD ROM and stored as a printer driver 30 in the memory of a digital copier 4. Such a digital copier comprises a scanner 31 and a laser printer 32. When an image is to be copied, the scanner 31 of the digital copier 4 first scans in an image. The printer driver 30 including compressed bit mask data generated by the bit mask generator computer 1 is then invoked which processes the scanned image and then causes the laser printer 32 of the digital copier to output a printed image 36.

Overview of the Generation of Bit Mask Data

The generation of bit masks by the generation module 8 of the bit mask generator computer 1 which results in a set of bit masks which can be utilized to generate half-tone output images 29, 36 where toner representing the images is arranged in a pleasing manner in which contouring is controlled and in which the rendering of small isolated printed and unprinted areas is reduced will now be described in detail with reference to FIGS. 3-10.

FIG. 3 is a block diagram of the generation module 8 of the bit mask generator computer 1 of FIG. 1.

In this embodiment the generation module 8 comprises a mask generation module 40 for coordinating the generation of data representative of a set of bit masks; a weight mask store 42 configured to store data representative of a weighting function which will be described in detail later; a random number table 44 comprising a stored array of floating point numbers ranging between 1 and −1 where the numbers are randomly arranged in the array and the numbers are randomly spread in the range 1 to −1; a current mask store 46 and a working mask store 47 being a pair of stores for storing an array of zeros and ones representative of a bit mask currently being generated; a current weight map store 48 and a working weight map store 49 being stores for a pair of arrays floating point numbers associated with the bit mask being generated; an out of position list 50 and a new dot list 52 being data stores identifying co-ordinates in the current bit mask array being generated; and a bit mask store 54 for storing data representative of bit masks for levels of grey scale which have previously been generated by the generation module 8.

In this embodiment the mask generation module 40 is arranged to generate a set of 256 bit masks each of the bit masks comprising a 32 by 32 array of zeros and ones. The current and working mask stores 46, 47 are therefore configured each to store a 32 by 32 binary array and the current and working weight map stores 48, 49 and random number table 44 comprise 32 by 32 arrays of floating point numbers. Initially the entries in the current and working mask stores 46, 47 and the current and working weight map stores 48, 49 are all set to zero. Random floating point numbers randomly arranged are pre-stored in the random number table 44.

Each of the bit masks generated by the mask generation module 40 is representative of an arrangement of dots which is indicative of the grey level associated with the array. Where the bit masks are utilized to convert an area of plain image of a certain grey level into a half-tone image the resultant pattern of toner representing that area of plain color will correspond to the arrangement of ones in the generated array. In order to generate images which are visually pleasing, it is desirable that the dots in an image representing an area of plain color are evenly distributed and not excessively clumped together. For that reason, the mask generation module 40 is arranged to generate bit masks where the position of ones in the generated bit mask arrays are spread across the array.

However, in the case of bit masks for laser printers it is also preferable that bit masks are such to limit the occurrence of isolated small areas of toner or small unprinted areas in output images as such isolated small areas of toner or unprinted areas are not rendered reliably by laser printers. Thus in accordance with the present invention, the bit mask generation module 40 is such to balance these competing requirements for a bit mask set which avoids excessive clumping of one entries in the array whilst at the same time endeavoring to reduce the number of isolated small areas of toner and small isolated unprinted areas in output images by ensuring that the bit masks do not include isolated one or zero entries.

It is also desirable that the generated patterns are in some way randomized so that artifacts which arise when lines of dots are generated in an image are avoided. As will be described in detail later, this is achieved in this embodiment by making positions of ones in generated bit mask arrays dependent upon the random values in the random number table 44.

In order to achieve these desired results, in use, for each grey scale level for which the mask generation module 40 is to generate a bit mask, the mask generation module 40 initially utilizes the random number table 44 and data within the current weight map store 48 to identify a set of possible candidates for amendment. As will be explained in detail, these candidates are selected in such a ways so as to space the candidates widely from pre-existing one entries in the bit mask being generated.

For each of the candidates for amendment it then is determined whether amending the candidate entry would cause either an isolated one entry or an isolated zero entry to appear within the bit mask. If such a candidate is identified which does not generate an isolated entry, a one is entered into the array stored in the current bit mask store 46 at that position. The data stored within the current weight map store 48 is then updated utilizing the weight function data stored in the weight mask store 42.

If all of the candidate entries are such to cause isolated one or zero entries to appear in the bit mask being generated, the mask generation module 40 then identifies for each candidate for amendment, a cluster of entries to be amended which avoids such a result occurring and one of the identified clusters is utilized to update the bit mask in the current mask store 46 and the weight map in the current weight map store 48.

Thus in this way for each particular grey level amendments are made which ensure that no isolated groups of ones or zeros appear in the bit mask but which at the same time causes new bit mask amendments to be spread across the bit mask array.

When the required number of zeros have been converted to ones, the mask generation module 40 then performs a smoothing operation on the bit mask for the level being created utilizing the weight maps in the current and working weight map stores 48, 49 the weight mask in the weight mask store 42 the random number table 44 and the out of position 50 and new dot lists 52. This smoothing operation optimizes the distribution of ones in the current bit mask so that they are distributed with the array in a manner which generates a pleasing grey scale image, whilst ensuring that the majority of the ones appearing in the bit mask for the immediately previous bit mask are also represented in the current bit mask and the occurrence of isolated one or zero entries is avoided.

After this optimization process has been performed for a particular grey level a copy of the current bit mask in the current mask in the current mask store 46 is made and stored in the bit mask store 54. The bit mask generation module 40 then proceeds to generate a new bit mask for the next level utilizing the bit mask for the previous level. The copying of data from one level to the next ensures that a spread of dots for adjacent grey levels is similar and hence reduces contouring. Thus in this way the bit mask generation module 40 causes to be generated and stored within the bit mask store 54 a set of 256, 32 by 32 binary arrays representative of a set of bit masks.

When a complete set of 256 bit masks has been generated and stored, the compression module 9 is then invoked. The compression module 9 proceeds to process the stored bit masks to generate compressed data approximately a tenth the size of the original bit mask data. This compressed data is recorded onto a CD ROM 10 for incorporation within printer drivers 25, 30 generated by the printer driver generator computer 2.

Processing by Bit Mask Generator Computer

Figure 4:
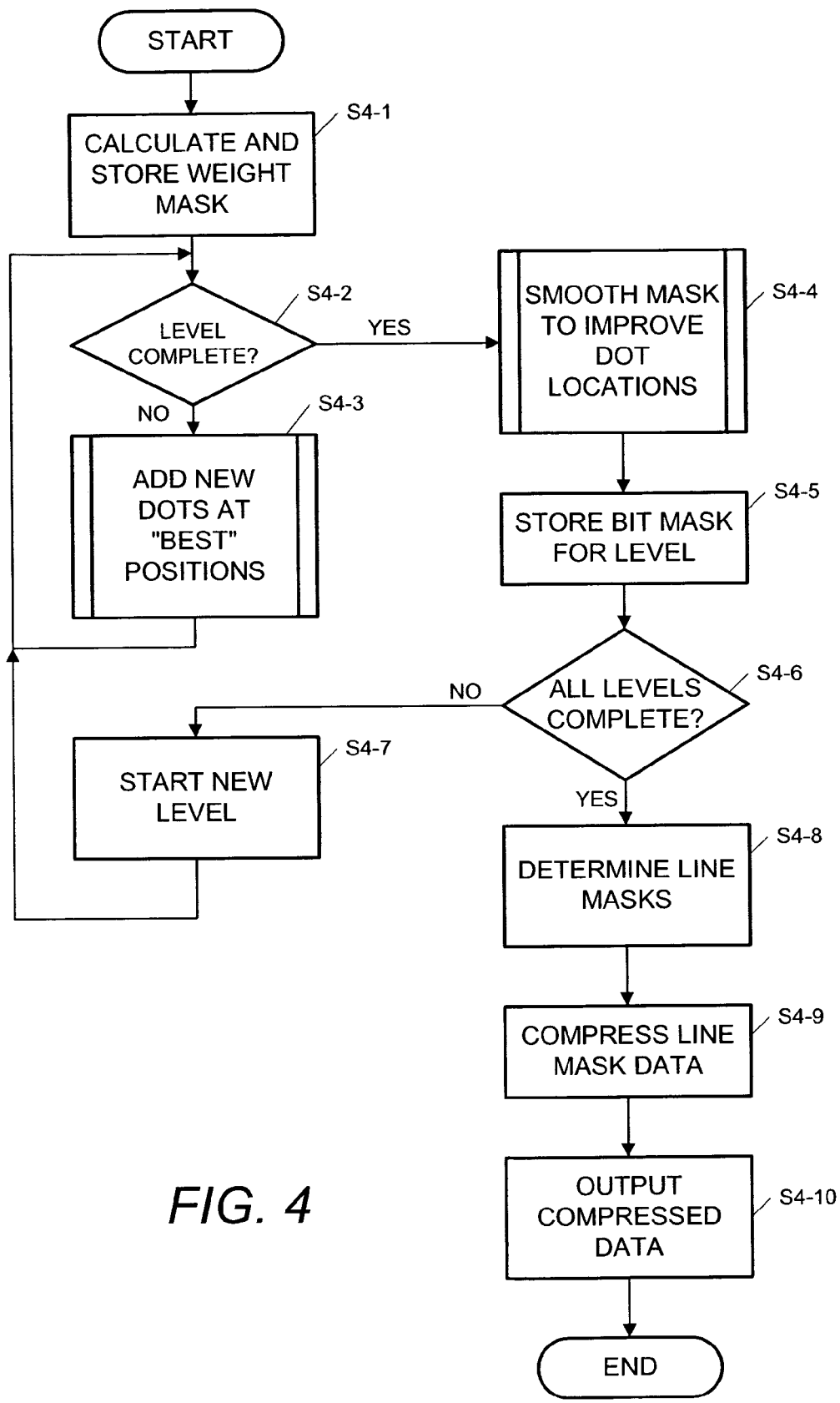
FIG. 4 is a flow diagram of the processing performed by the bit mask generator computer of the system of FIG. 2.

The overall processing of the bit mask generator computer 1 for generating bit mask data will now be described in greater detail with reference to FIG. 4 which is flow diagram of the processing of the bit mask generator computer 1.

(i) Generation of Bit Masks

Initially the bit mask generator computer 1 invokes the mask generation module 40. When the mask generation module 40 is first invoked the mask generation module 40 causes (S4-1) weight mask data to be stored in the weight mask store 42.

The weight mask data is representative of a function which enables a spread of ones within a bit mask to be achieved. To this end the mask generation module 40 stores data so that for each position in the bit mask array a value indicative of the relative closeness of that position to other ones in the array in a local neighborhood close to that position can be calculated. Specifically in this embodiment the following distance function is used:

$$D(x, y) = \begin{cases} \dfrac{1}{\sqrt{\partial x^2 + \partial y^2}} & \text{for } |\partial x^2 + \partial y^2| < 60 \\ 0 & \text{for } |\partial x^2 + \partial y^2| \geq 60 \\ 100 & \text{for } \partial x = \partial y = 0 \end{cases}$$

where δx and δy are determined from the difference in x co-ordinates and y co-ordinates in two points in an array respectively in using the following equations:

$$\delta x = [|x_1 - x_2| - 1] * \lambda_x + 1$$

$$\delta y = [|y_1 - y_2| - 1] * \lambda_y + 1$$

where $x_1$, $y_1$ and $x_2$, $y_2$ are co-ordinates for the two points in the array and $\lambda_x$ and $\lambda_y$ are scaling factors for scaling the distances in terms of co-ordinates to actual distances in output images in terms of the smallest dimensions of pixel in output images.

Thus in the case of a bit mask for a printer where the x dimensions and y dimensions of output areas of toner are equal, $\lambda_x$ and $\lambda_y$ would both equal 1 and equations would simplify to be the distances between two co-ordinates. Conversely in the case of a bit mask for use where the size of pixels in the x direction was half the size of pixels in the y direction, so that $\lambda_x = \pm \frac{1}{2}$ and $\lambda_y = 1$ the equations would become:

$$\delta x = \frac{1}{2}|x_1 - x_2| + \frac{1}{2}$$

$$\delta y = |y_1 - y_2|$$

Calculated values for the distance function for different pairs of x and y integer values are stored within the weight mask store 42.

FIG. 5 is an example of an array of data stored within the weight mask store 42 calculated utilizing the above distance function with $\lambda_x$ and $\lambda_y$ both equal to 1. As will be described by calculating these values and storing them in the weight mask store 42 the generation of weight maps indicative of the spread of one entries in a bit mask can be very rapidly determined.

After distance function data has been stored within the weight mask store 42, the mask generation module 40 determines (S4-2) whether the required number of zeros in the current bit mask have been converted to ones. The required number is determined using conventional techniques which enable the numbers of one entries in a set of bit masks to increase so that the resultant printed output appears as a set of shades of gradually decreasing intensity.

If the required additional number of zeros have not yet been converted to ones, the mask generation module 40 proceeds (S4-3) to select a number of zero entries within the array stored in the current bit mask store 46 and modify those zero entries to become one entries.

More specifically referring to the flow diagram of FIG. 6, which is a flow diagram of the processing of the mask generation module 40, the mask generation module 40 initially (S6-1) searches the weight map stored in the current weight map store 48 to identify the smallest value in the array of numbers in the current weight map store 48

In this embodiment initially the weight map comprises a 32 by 32 array of zeros and therefore initially this least value will equal 0.

The mask generation module 40 then (S6-2) identifies the co-ordinates of the positions in the weight map which are associated with a value not more than a threshold percentage greater than the least value of an entry in the weight map in the current weight map store 48. In this embodiment, this threshold is set to 2% of the identified least value.

These co-ordinates are then stored in a list in order of ascending associated weight map values as a list of candidates for amendment. Where two or more entries are associated with the same weight map value, those entries are then ordered by ascending values for the identified co-ordinates stored in the random number table 44.

Once an ordered list of candidates for amendment has been generated, the mask generation module 40 then (S6-3) selects the first set of co-ordinates in the list and determines (s6-4) whether modifying the zero entry identified by those coordinates would act to extend a pre-existing cluster of one entries in the array stored in the current mask store 46.

More specifically in this embodiment, the mask generation module 40, initially tests the entries in the array in the current mask store 46 to establish whether modifying the entry identified by the co-ordinates being processed would lead to the generation of a new cluster of one entries in the array.

FIG. 7 is a schematic illustration of twelve patterns for viable clusters in accordance with this embodiment of the present invention. In this embodiment the mask generation module 40 initially checks whether modifying the zero entry identified by the co-ordinates being processed would lead to the generation of a cluster of one entries of the type illustrated by (i) where the shaded square indicates the entry being considered. Thus in the case of shape (i) where the co-ordinate (x,y) is the a zero entry being considered for modification, the mask generation module 40 would also try to establish whether the entries associated with (x,y−1) and (x+1,y) are both also associated with one values. If the selected zero entry is at the edge of the array so that no adjacent entry for checking exists, the mask generation module 40 checks the entry at the identified position at the opposite edge of the array instead.

After having tested for whether the modification of the zero entry identified by the co-ordinates being processed will lead to the generation of a cluster of one entries shaped as in FIG. 7 (i) if this is not the case the next pattern shown in FIG. 7 is then tested. Thus in the case of zero entry at (x,y) the mask generation module 40 would attempt to establish whether (x+1,y) and (x,y+1) were both one entries. This testing is repeated until either modification of the zero entry being considered is found to lead to the generation of a cluster of one entries or alternatively it is determined that the modifying the zero entry does not lead to the generation on a cluster of one entries.

If it is determined that modifying the zero entry identified by the coordinates being processed does not lead to the generation of a new cluster of one entries of the type illustrated in FIG. 7, the mask generation module 40 then determines whether modifying the zero entry identified by the co-ordinates being processed extends a pre-existing cluster of one entries.

In this embodiment this is achieved by the mask generation module 40 checking in the case of a candidate zero entry for modification having co-ordinates (x,y) whether any of the following co-ordinates: (x+1,y) (x−1,y) (x,y+1) or (x,y−1) is associated with a one entry in the array stored in the current mask store 46 and in the same way as has been described above whether any of these identified one entries form part of a cluster of one entries of the type illustrated in FIG. 7. Again if any identified entry is at the edge of the array so that no adjacent entry for checking exists, the mask generation module 40 checks the entry at the identified position at the opposite edge of the array instead.

If the mask generation module 40 determines (S6-4) that modifying the zero entry identified by the candidate co-ordinates being processed does not either result in the generation of a cluster of one entries in the array in the current mask store 46 or alternatively extend a pre-existing cluster of one entries in the array, the mask generation module 40 then (S6-5) determines whether all of the candidate coordinates in the generated candidate list have been processed. If this is not the case the next entry in the list of candidates is selected (S6-6) and that co-ordinate is tested to see whether the co-ordinate is immediately adjacent a pre-existing cluster of one entries (S6-4).

If when a candidate for amendment is tested it is determined (S6-4) that the candidate for amendment either results in the generation of a new cluster of one entries or the candidate is adjacent to a pre-existing cluster of one entries, the mask generation module 40 then (S6-7) proceeds to update the zero entry in the current mask store 46 associated with the candidate co-ordinates being processed and then updates the data stored within the current weight map store 48.

Specifically the mask generation module 40 amends the zero entry in the current mask store 46 identified by the co-ordinates being processed and then takes each entry in the weight map in the current weight map store 48 in turn and determines an x distance and a y distance for the relative positions of the point on the grid being updated and position of the zero in the bit mask which has been changed to a one utilizing the following equations:

$$x\text{dist} = \min[abs(X_1 - X_2), w - abs(X_1 - X_2)]$$

$$y\text{dist} = \min[abs(Y_1 - Y_2), h - abs(Y_1 - Y_2)]$$

where $X_1, Y_1$ are the co-ordinates of the zero in the current bit mask 46 which has been changed to a one, $X_2, Y_2$ are the co-ordinates of the position in the array in the weight map 48 which is about to be updated and w and h are the values corresponding to the width and the height of the array which in this embodiment are both equal to 32.

Provided that the sum of the squares of the calculated x and y distances is less than a threshold which in this embodiment is set to 49, the mask generation module 40 then utilizes the x and y distances to look up a value in the weight mask store 42, and proceeds to update the entry for the identified position in the weight map in the current weight map store 48 utilizing the following equation:

$$W_{new} = W_{old} + \text{weight mask value} * [1 + f(\text{level}) * r(x,y)]$$

where $W_{new}$ is the new value stored in the position in the array in weight map store 48, $W_{old}$ is the previous value stored in array the weight map store 48, the weight mask value is the value retrieved utilizing the weight mask store 42 and f(level) is a function which ranges between 0 and 1 which varies dependent on the level of grey for which a bit mask is being generated and r(x, y) is the random number value stored in the corresponding location in the random number table 44 to the position in the weight map being updated.

FIG. 8 is graph illustrating the function f(level) utilized in this embodiment of the present invention. In this embodiment a value equal to zero for f(level) is utilized for the first 64 generated bit masks and the last 64 bit masks in a set of bit masks with the function f(level) increasing to a maximum value of 1 for the 128th bit mask in a set of bit masks being generated. In this embodiment the function f(level) is in the form of a distorted, shifted normal curve, rising rapidly in the values 70-100 and falling rapidly for the values 130-160.

The generation of a weighting value dependent upon the random number from 1 to −1 in the random number table 44 introduces an element of noise into the weight values stored within the weight map 48. When the bit masks being generated is between a quarter full of zeros and three quarters full of zeros a distribution of ones and zeros based upon a distance function alone often results in bit masks which are in a form of an ordered array such as a series of lines or columns. Such regular arrangements of dots have a tendency to appear as artifacts within output images. By introducing the noise element in this way such regular arrays are prevented from being created. Utilizing the stored values in the random number table 44 to achieve this, the identification of a position as being suitable for being converted from a zero to a one is achieved in a repeatable manner.

FIGS. 9A and B are an illustrative example identifying a zero entry being modified in an extract of an array of numbers representing a portion of a bit mask and the associated increase in values of corresponding weight map entries resulting from the update of the weight map utilizing the weight mask illustrated in FIG. 5 with f(level) set to zero.

As can be seen from the exemplary illustrations of FIGS. 9A and 9B, the updating of the weight map in the manner detailed above is to increase the weight map entries for co-ordinates in the vicinity of the zero being modified. The increase in weight map entry values is such to cause the entries associated with co-ordinates close to co-ordinates identifying one entries in a bit mask in the current mask store 46 to be associated with higher weight map values. Thus by choosing zero entries associated with the lowest weight map entries as candidates for modification the mask generation module 40 is such to generate bit masks where one entries are spread across the bit mask. At the same time by limiting modifications to those which create new clusters of one entries or extend pre-existing clusters of one entries, the mask generation module 40 ensures that the generated bit mask is such to reduce the presence of areas of half-tone images which are to be represented by isolated small areas of toner.

After the weight map has been updated (s6-7), the mask generation module then determines (s6-8) whether the modification of the current bit mask has caused the bit mask to be modified so that there are any isolated zero entries which will result in the generation of an isolated hole in a printed image which may not be reliably printed. More specifically, the mask generation module 40 checks each of the eight bit mask entries for the co-ordinates immediately adjacent to the entry which has just been updated in the array stored in the current mask store 46 Thus in the case of amending a value associated with co-ordinates (x,y) each of the following co-ordinates is considered: (x−1,y−1),(x−1,y),(x−1,y+1),(x,y−1),(x,y+1), (x+1,y−1),(x+1,y),(x+1,y+1) Again in the case of a modified entry at the edge of the array the entry at a corresponding positions at the opposite edge are considered in place of the co-ordinates which do not identify existing entries. Whenever any of the entries in the bit mask associated with these co-ordinates is equal to zero, the mask generation module 40 then checks to ensure that these zero values are part of a larger viable group of adjacent zero values.

In a similar way to which a candidate zero entry is tested to determine whether modification of the zero entry generates or extends a cluster of one entry in the array in the current mask store 46, the mask generation module 40 tests each of the adjacent co-ordinates (x−1,y−1),(x−1,y),(x−1,y+1),(x,y−1), (x,y+1),(x+1,y−1),(x+1,y),(x+1,y+1) in turn. First of all it is determined whether an adjacent co-ordinate identifies a zero entry in the mask in the current mask store 46. If this is not the case no further testing of that co-ordinate is required.

If an adjacent co-ordinate does identify a zero entry, the adjacent co-ordinate is then tested to see if the identified zero entry is part of a larger cluster of zero entries. This is achieved in the same way as has been described in relation to step (s6-4) above by initially testing whether the zero entry is part of a pattern zero entries illustrated by (i) of FIG. 7 where the shaded square indicates the zero entry being considered. If this is not the case the next pattern shown in FIG. 7 is then tested until either the zero entry being considered is found to form part of a cluster of zero entries or alternatively it is determined that the zero entry is not part of a cluster of the types illustrated in FIG. 7.

Finally, if a zero entry is determined not to form part of a cluster of zero entries of the form illustrated in any of the patterns of FIG. 7, the mask generation module 40 then tests the zero entries associated with co-ordinates adjacent to the zero entry being tested to determine whether those co-ordinates identify a zero entry forming part of a cluster of zero entries. Thus in this way the mask modification module 40 establishes whether any zero entries adjacent to an entry which has been modified to become a one entry is either part of a cluster of zero entries or is alternatively immediately adjacent to a cluster of zero entries.

If after having tested all of the co-ordinates adjacent to the zero entry which has just been modified it is found that these entries are either already one values or alternatively are zero values all of which form part of a larger clusters of zero values, this will have established that the candidate modification does not cause an isolated or an excessively small cluster of zero values to be generated. If this is the case, the mask generation module 40 ends the search for a candidate entry for modification and having updated the stored bit mask and weight map in the current mask 46 and current weight map 48 stores, the mask generation module 40 then (S4-2) checks whether the required number of modifications for the level being generated has now been reached or exceeded.

If, however, it is determined (s6-8) that the modification of the candidate entry from a zero to a one is such to cause a small isolated group of zero entries to be created, the mask generation module 40 proceeds to reset (s6-9) the candidate entry in the current mask store 46 to zero and update the weight values in the current weight map store 48 to reverse the previous modification of the weight map values.

Specifically in a similar manner to which the weight mask generation module 40 updates the values of entries in the weight map in the weight map store 48 when a new one is added to a current mask in the current mask store 46 the mask generation module 40 removes the effect of modifying the currently selected one from a zero to a one from the weight map by updating the entries in the weight map utilizing the following equation.

$$W_{new} = W_{old} - \text{weight mask value} * [1 + f(\text{level}) * r(x,y)]$$

Where $W_{new}$, $W_{old}$, weight mask value, f(level) and r(x,y) are values calculated in the same way as has previously been described.

The mask generation module 40 then proceeds to determine (S6-5) whether the final candidate in the list of candidates for modification has been reached and if this is not the case select the next candidate for modification (S6-6) before determining whether this candidate is suitable for modification (S6-4).

Thus in this way the mask generation module 40 proceeds to process each of the identified candidates for modification in turn until either a suitable candidate amendment involving the modification of a single zero entry is identified or alternatively it is determined that modifying any of proposed candidate entries will either generate an isolated one entry or a small group of zero entries in the bit mask.

If it is determined (S6-5) that the entire candidate list has been processed and that each of the candidates results in the generation of an isolated one entry or a small group of zero entries, the mask generation module 40 then proceeds to select an alternative modification involving a modification of multiple zero entries in the current bit mask being generated as will now be described with reference to FIG. 6B.

Initially (S6-10) the mask generation module 40 proceeds to make a copy of the current mask in the current mask store 46 and the current weight map in the current weight map store 48 and places corresponding copies in the working mask store 47 and the working weight map store 49.

The mask generation module 40 then selects the first of the candidates for amendment and determines (S6-11) whether the candidate for amendment was previously rejected because the entry led to the creation of an isolated one entry in the array being generated.

If this is not the case and a candidate for amendment had been rejected because the modification of a candidate zero entry led to the creation of an isolated group of zero entries, the mask generation module 40 then (S6-12) proceeds to amend the zero entry identified by the candidate co-ordinates currently being processed in the bit mask stored in the working mask store 47 by setting that zero entry equal to one and the co-ordinates of the amended entry are then added to a list of co-ordinates for checking. In the same way as has previously been described the weight map in a working weight map store 49 is then updated to account for the modification of the bit mask in the working mask store 47 using the same equation as has previously been described in relation to step (S6-7).

If the mask generation module 40 determines (S6-11) that a candidate modification was previously rejected because the mask generation module 40 determined that a modification of an entry resulted in the creation of an isolated one entry in the bit mask, the mask generation module 40 then (s6-13) proceeds to modify the bit mask stored in the working mask store 47 by modifying a cluster of one entries including the candidate for modification.

More specifically, the mask generation module 40 initially modifies the zero entry associated with the candidate co-ordinates being processed by setting that zero entry to a one and in the same way as has previously been described the weight map in a working weight map store 49 is then updated to account for the modification of the bit mask in the working bit mask store 47 using the same equation as has previously been described in relation to step (S6-7).

The mask generation module 40 then considers each of the potential cluster shapes illustrated in FIG. 7 in turn and identifies the cluster shape associated with weight values in the working weight map store 49 which sum to the lowest total.

Thus for example when considering the weight values for generating a cluster of the form illustrated as cluster (i) in FIG. 7 where the candidate entry for amendment has co-ordinates (x,y) the mask generation module 40 would determine the sum of the weight value entries in the working weight map store 49 associated with co-ordinates (x,y−1) and (x+1,y). Again in the case of a candidate entry at the edge of the array the appropriate co-ordinates at the opposite edge of the array are utilized.

When the cluster shape associated with the lowest total weight value has been identified, the zero entries for the co-ordinates forming the other members of the identified cluster shape are then modified in the bit mask stored in the working mask store 47 by being set to one. In the same way as has previously been described in step (s6-7), the weight map in the working weight map store 49 is updated using the co-ordinates of the two other members of the cluster associated with the lowest total weight value. Finally, the co-ordinates for the candidate currently being considered and the co-ordinates for the two other members of the cluster are added to a list of entries for checking.

Thus at this stage the generation module 8 will have stored a list identifying all of the entries in the working mask store 47 which differ from corresponding entries in the current mask store 46 and the arrangement of one entries and zero entries in the working mask store 47 will be such that no isolated one entries appear within the mask. Finally, the values in the working weight map store 49 will define a distance function indicating the extent to which points in the array stored in the working mask store 47 are distanced from one entries occurring in the bit mask array stored in the working mask store 47.

The mask generation module 40 then (S6-14) selects the first of the coordinates in the list of co-ordinates identifying entries which have just been amended and determines (S6-15) whether the modification of that entry has led to the creation of isolated zero entries in the bit mask stored in the working mask store 47. More specifically, when an entry for having co-ordinates (x,y) has been modified, the mask generation module 40 tests each of the eight entries in the working mask store 47 adjacent to the modified entry in turn to determine in the same way as has previously been described in step (S6-8) to determine whether any of the adjacent entries are now part of an isolated cluster of zero entries. Once again in the case of an entry at the edge of the array, corresponding co-ordinates at the opposite edge of the array are checked.

Whenever an adjacent co-ordinate is determined to be part of an isolated cluster of zeros the mask generation module 40 proceeds to modify (s16-16) the zero entry for that co-ordinate in the working mask store 47 by setting the zero entry to be a one entry. The mask generation module 40 then updates the weight values in the weight map stored in the working weight mask store 49 in the manner which has previously been described in relation to step (S6-7) and adds the coordinates of the newly modified entries in the working mask store 47 to the list of coordinates for checking.

After all of the neighboring entries adjacent to the modified entry have been checked and updated if necessary, the mask generation module 40 then (S6-17) determines whether all of the modified entries in the list of modified entries have now been checked to determine whether their modification has generated the existence of isolated zero entries in the bit mask. If this is not the case, the mask generation module 40 then (S6-18) proceeds to select the next set of coordinates in the list of modified entries and determine (S6-15) whether the entries adjacent to that modified entry now form part of an isolated group of zeros (S6-15).

Thus in this way the mask generation module 40 proceeds to modify the array in the working bit mask store 47 and the weight map in the working weight map store 49 until the mask generation module 40 determines (s6-17) that an arrangement of one entries and zero entries has been achieved in which no isolated zero entries exist.

The mask generation module 40 then calculates (s6-19) a score for the proposed modification involving the candidate for modification currently being processed. This is achieved by determining the difference between the sum of weight map entries in the current weight map store 48 for the co-ordinates of modified entries and the sum of the weight map values from the working weight map store 49 for the same co-ordinates identifying modified entries. This data is then stored together with the list identifying the co-ordinates of the entries proposed to be modified.

The mask generation module 40 then (S6-20) determines whether the final candidate of proposed candidates for amendment has been reached. If this is not the case the mask generation module 40 resets the data within the working mask store 47 and the working weight map store 49 by copying data from the current mask store 46 and the current weight map store 48 respectively. The mask generation module 40 then proceeds to select (S6-21) the next candidate in the list of potential candidates for modification and determine whether that candidate was rejected for not forming part of a cluster of one entries (S6-11) before utilizing the proposed candidate for amendment to generate an alternative bit mask where the proposed candidate is set to one and the bit mask is modified so that no isolated group of one entries or zero entries exist in the mask (S6-12-S-20).

When it is determined that the final candidate for amendment has been processed (s6-20), the generation module 8 will have stored for each of the candidates in the generated list of candidates for amendment: a list of co-ordinates of zero entries to be modified to create an alternative bit mask which does not include isolated clusters of one entries or zero entries and also a change in weight score associated with each of the proposed modifications.

The mask generation module 40 then (S6-22) proceeds to select as the amendment to be utilized the amendment involving the smallest number of modifications to the current bit mask which is associated with the smallest change in weight score. In the case of two possible amendments involving the same number of changes to bit mask entries which have the same weight score, the amendment generated by the candidate for modification associated with the least value in the random number table 44 is selected for as the modification to be performed.

When the modification to be performed has been identified the mask generation module 40 proceeds to amend each of the zero entries in the current mask store 46 identified by the co-ordinates of the list identifying the selected amendment and then proceeds to utilize the co-ordinates one by one to update the values in the current weight map store 48 using the same equation as has been described above in relation to step (S6-7).

Thus in this way the mask generation module 40 amends the bit mask stored in the current mask store 46 to become an alternative arrangement of ones and zeros where the modification is associated with the lowest increase in weight values which at the same time ensures that the arrangement of ones and zeros in the current mask store 46 is not so as to include isolated one entries or isolated zero entries which may lead to unreliable rendering in an output image.

Returning to FIG. 4, the mask generation module 40 then (S4-2) determines whether at least the required number of zero entries has been modified in the bit mask stored in the current bit mask store 46. If this is not the case the mask generation module 40 proceeds (S4-3) to modify one or more further zero entries in the manner described in relation to FIGS. 6A and 6B before checking once again (S4-2) whether sufficient modification of the bit mask for the current level has been made.

Figure 10A:
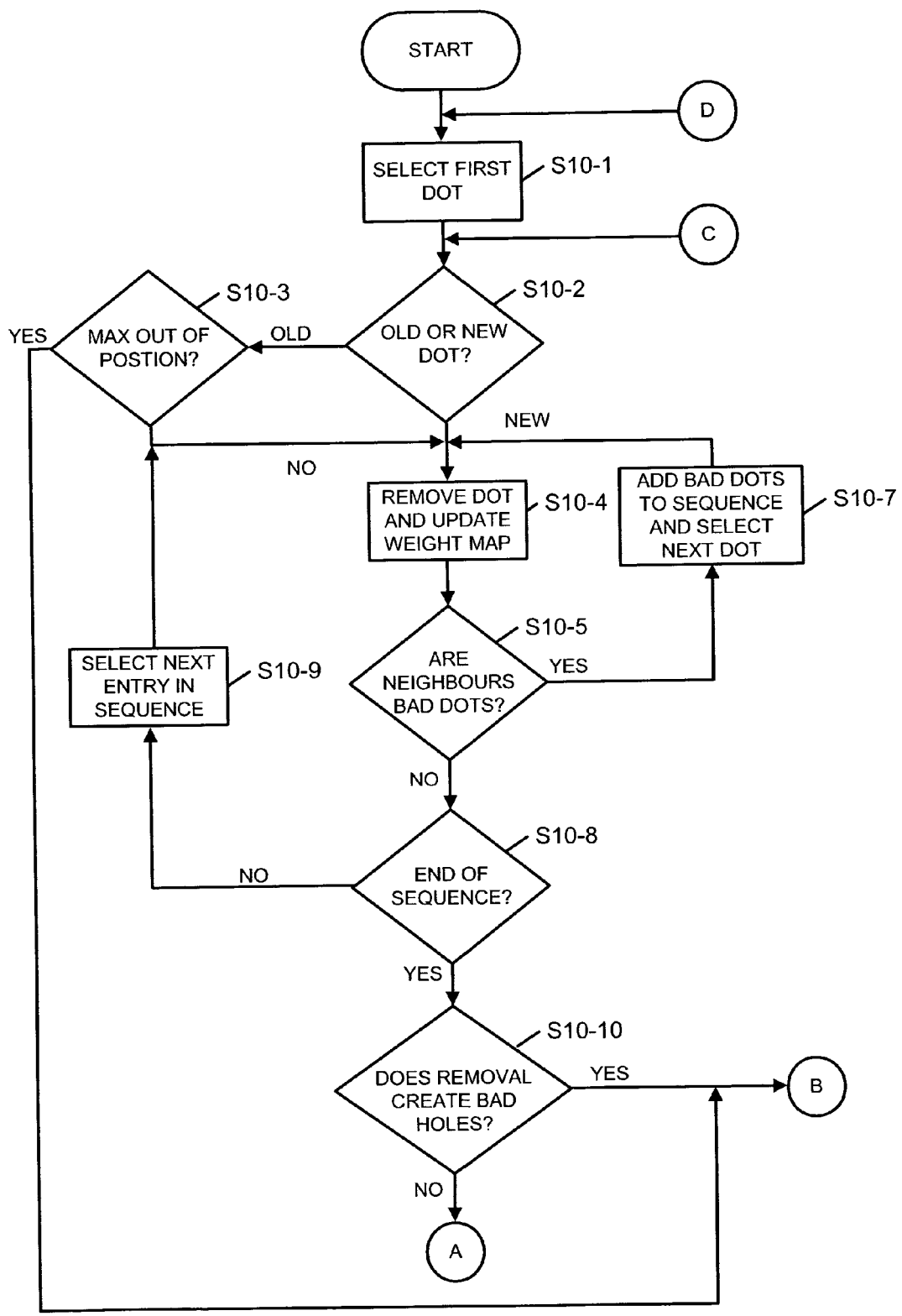
Figure 10B:
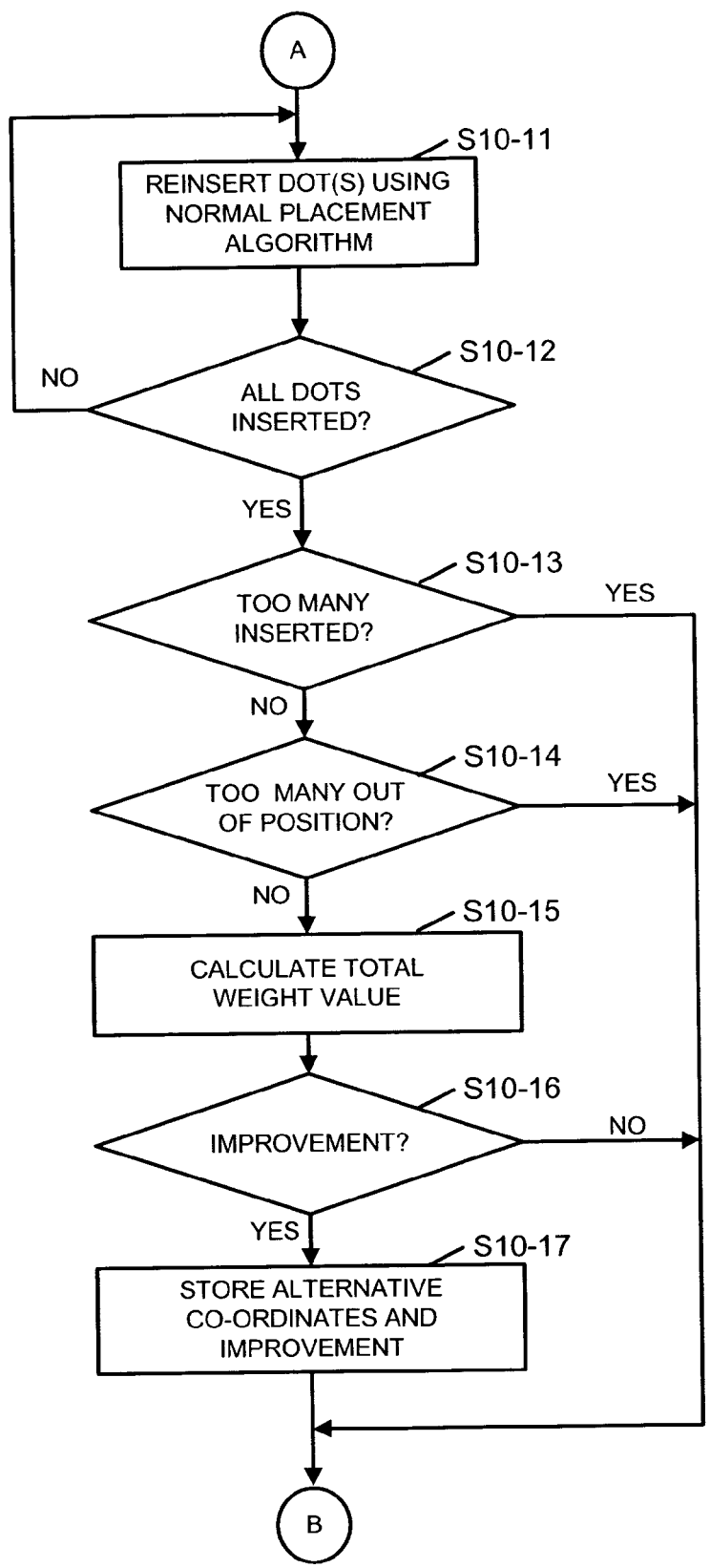
Figure 10C:
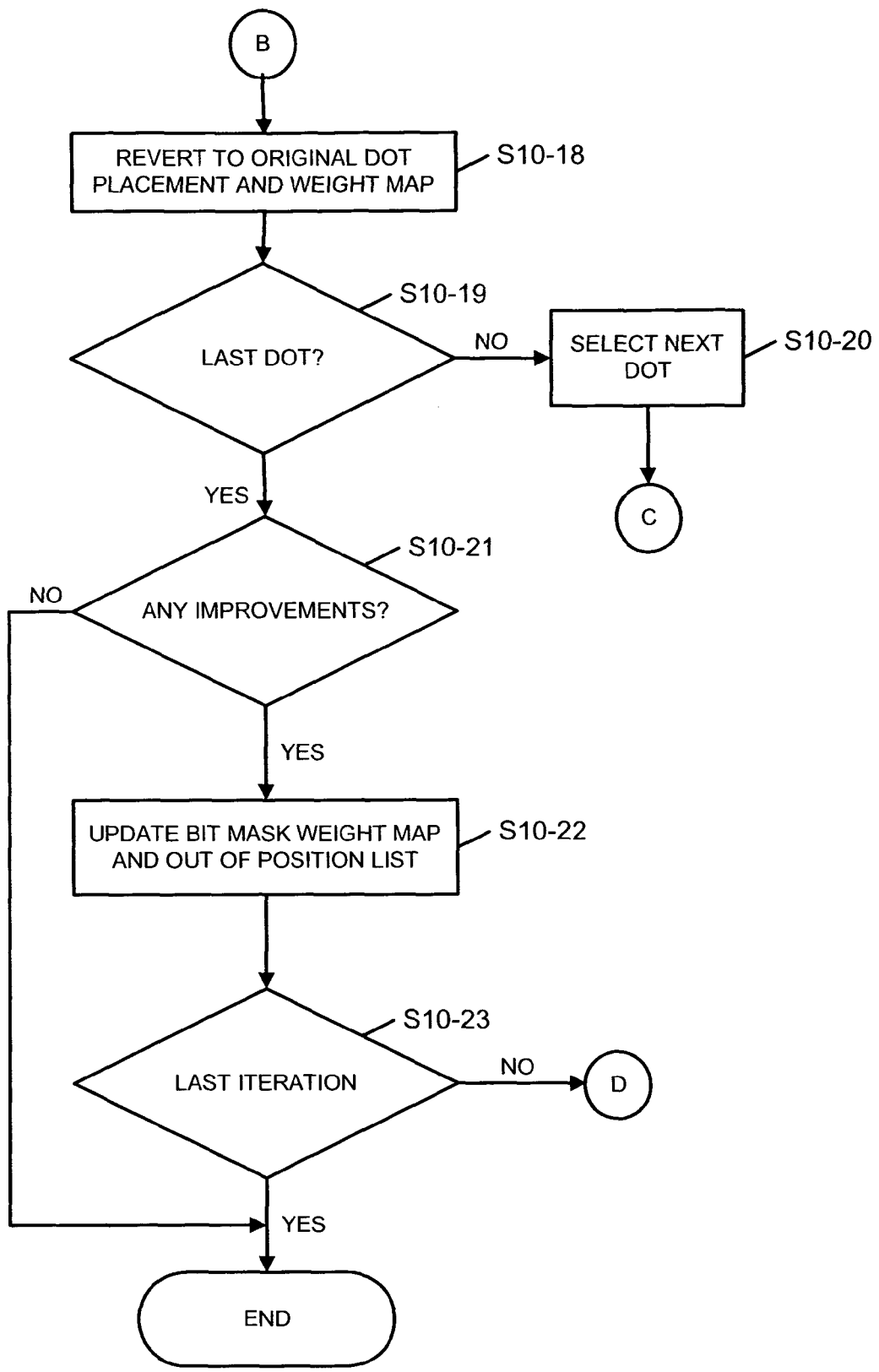

When the required number of zeros in the bit mask array have been modified (S4-2) the mask generation module then proceeds to optimize the positions for the ones within the newly calculated bit mask (S4-4) to improve the spread of one entries in the mask if this is possible as will now be described with reference to FIGS. 10A-C.

(ii) Modifications of Bit Mask

As described so far the selection of zeros within the current mask store 46 which are converted to ones is based upon a function which is dependent upon the arrangement of pre-existing one within a bit mask array. This means that the initial selection of zeros which are converted to ones has a very strong influence of the subsequent positions of ones in the bit masks for that and subsequent levels. In order to reduce the influence of the early modifications in this embodiment once an initial bit mask for a level has been generated, a smoothing operation (S4-4) is performed to determine whether modifying the initial bit mask array can improve the spread of one entries in the array without generating isolated groups of one or zero entries. The processing involved in performing this smoothing operation will now be described with reference to FIGS. 10 A-C.

When performing a smoothing operation on a bit mask for a level, the mask generation module 40 first (s10-1) stores data in a new dot list 52 identifying the co-ordinates of the one entries in the array for the current level which correspond to zero entries in the bit mask array for the previous level. The mask generation module 40 then copies the bit mask and weight map stored in the current mask store 46 and current weight map store 48 into the working mask store 47 and working weight map store 49 respectively and then scans the bit mask array stored in the working mask store 47 until the first one in the array is identified.

The mask generation module 40 then (S10-2) determines whether the selected one in the array corresponds to a co-ordinate identified by the new dot list 52. If this is the case this indicates that the selected one is represented by a zero in the bit mask for the previous level. If the co-ordinates of the selected one in the array are not stored within the new dot list 52 this indicates that the one in the array is also represented as a one in the array for the previous level.

If the mask generation module 40 determines that (S10-2) the selected one is also represented by a one in the previous level in the bit mask the mask generation module 40 then (S10-3) determines how many co-ordinates are contained within the out of position list 50 and compares this with a threshold value.

In this embodiment in order to reduce the effect of contouring for the first 16 bit masks when a one is present in an array for one level it is also made to be present in the next level.

Where there are very few ones in an array and hence very few dots of toner are printed, changing the arrangement of ones and hence the arrangement of dots which are printed can give rise to noticeable contouring. In contrast where more ones appear in the array and hence more dots of toner are printed such as is the case for bit mask arrays for mid range shades the effect of modifying the position of a relatively small number of those dots does not give rise to noticeable contouring effects but it can improve the visual appearance of an array of dots representative of intermediate grey scales.

Thus in this embodiment the threshold used to identify the number of ones in an array for previous levels which can be modified varies dependent upon the grey level a bit mask is intended to represent. Specifically in this embodiment for the first 16 levels no ones represented in previous arrays can be modified and for all subsequent levels up to four ones from a previous array can be moved.

Thus for example where the mask generation module 40 is processing one of the first 16 levels of bit mask and the mask generation module 40 identifies that a selected one from an array is also represented in a previous array the mask generation module 40 then does not proceed to attempt to change the position of that one within the array. In contrast if the level of bit mask being generated is greater than 16 and fewer than four of the positions of ones in the current array representative of ones in a previous array have had their positions modified the mask generation module 40 proceeds (S10-4-S10-19) to determine whether the spread of one entries in the array can be improved by altering position of the one entry being processed whilst avoiding the generation of isolated one or zero entries in the array.

The mask generation module 40 (S10-4) then amends the selected one entry in bit mask in the working bit mask store 47 by setting the selected one entry to be a zero. The mask generation module 40 then updates the weight map in the working weight map store 49 to remove the effect of the presence of the current selected one from the array in the same way as has previously been described in relation to step (S6-9).

Next, the mask generation module 40 determines (S10-5) whether the alteration of the selected one entry has caused any of the selected entry's neighbors to cease to be part of a viable cluster of one entries in the bit mask array stored in the working mask store 47.

This is achieved by the mask generation module 40 testing each of the eight entries in the working mask store 47 for the co-ordinates immediately adjacent to the entry which has just been updated. As has previously been described in the case of entries at the edge of the array, corresponding entries on the opposite edge of the array are checked. Whenever any of the entries in the bit mask associated with these co-ordinates is equal to one, the mask generation module 40 then checks to ensure that these one entries are part of a larger group of adjacent one entries to determine whether the entries form part of a cluster of one entries corresponding either to any of the cluster shapes illustrated in FIG. 7 or are one entries immediately adjacent entries forming part of a cluster of one entries corresponding to one of the shapes of FIG. 7. This testing is performed in the same way as has previously been described in relation to the testing for isolated one entries described in relation to step (s6-4).

If any of the adjacent entries are identified as no longer being within a viable cluster of one entries, the co-ordinates of these entries are added to a sequence of co-ordinates identifying the one entries which have been amended (S10-7) and the next co-ordinates in the sequence are then selected for processing in the same way as has been described above (s10-4-s10-5).

If when processing co-ordinates in the sequence of co-ordinates identifying amended entries it is determined (s10-5) that none of the entries adjacent to a co-ordinate being processed is a zero entry forming part of an excessively small cluster of zero entries, the mask generation module 40 then checks (S10-8) to see whether the final co-ordinates in the sequence for co-ordinates to check have been processed. If this is not the case the next set of co-ordinates are selected (s10-9) and the mask in the working mask store 47 and weight map in the working weight map store are updated using the selected co-ordinates (s10-4) before points adjacent to the selected co-ordinates are tested (s10-5) to see if they are now isolated zero values in the mask in the working mask store 42.

Thus in this way mask generation module 40 proceeds to amend the bit mask in the working mask store 49 by setting a number of adjacent existing one entries to zero entries including the one entry currently initially selected for processing until no isolated one entries exist in the bit mask in the working bit mask store 49. At the same time the mask generation module 40 also updates the weight map in the working weight map store 49 so that the weight map identifies a function indicating the distance of points in the array from one entries in the updated array stored in the working mask store 47.

Having amended the mask in the working bit mask store so that no excessively small clusters of one entries exists, the mask generation module 40 then (S10-10) tests each of the newly modified one entries in turn to establish whether the replacement the one entries by zero entries has led to the creation of any isolated zero entries.

More specifically the mask generation module 40 takes the co-ordinates of each of the modified one entries in turn. For each of the modified one entries, the mask generation module 40 first checks whether the modified entry which is now set to zero forms part of a cluster of zero entries in the bit mask in the working mask store 49 of the type illustrated in FIG. 7 in the same way as this testing is performed as described in relation to step (s6-8). Again in the case of entries at the edge of an array appropriate entries at the opposite edge of the array are tested. If it is determined that a zero entry being tested does not form part of a cluster of zero entries corresponding to one of the shapes of FIG. 7 then any zero entries adjacent to the zero entry being tested are checked to see if they form part of a cluster of zero entries in the manner which has previously been described.

If it is determined (s10-10) that the proposed amendment gives rise to an isolated zero entry which does not form part of one of the clusters of FIG. 7 or is not immediately adjacent to a zero entry forming part of such a cluster the proposed amendment utilizing the current candidate for amendment is abandoned. Conversely if, however, when (s10-10) the mask generation module 40 tests all of the co-ordinates of the modified entries it is found that all of the modified entries now form part of larger clusters of zero entries, this establishes that the bit mask stored in the working mask store 47 contains no isolated one entries or zero entries. The array stored in the working mask store 47 can then be utilized to see whether an alternative arrangement of ones and zeros can be found which results in a better spread of ones throughout the bit mask.

Figure 6A:
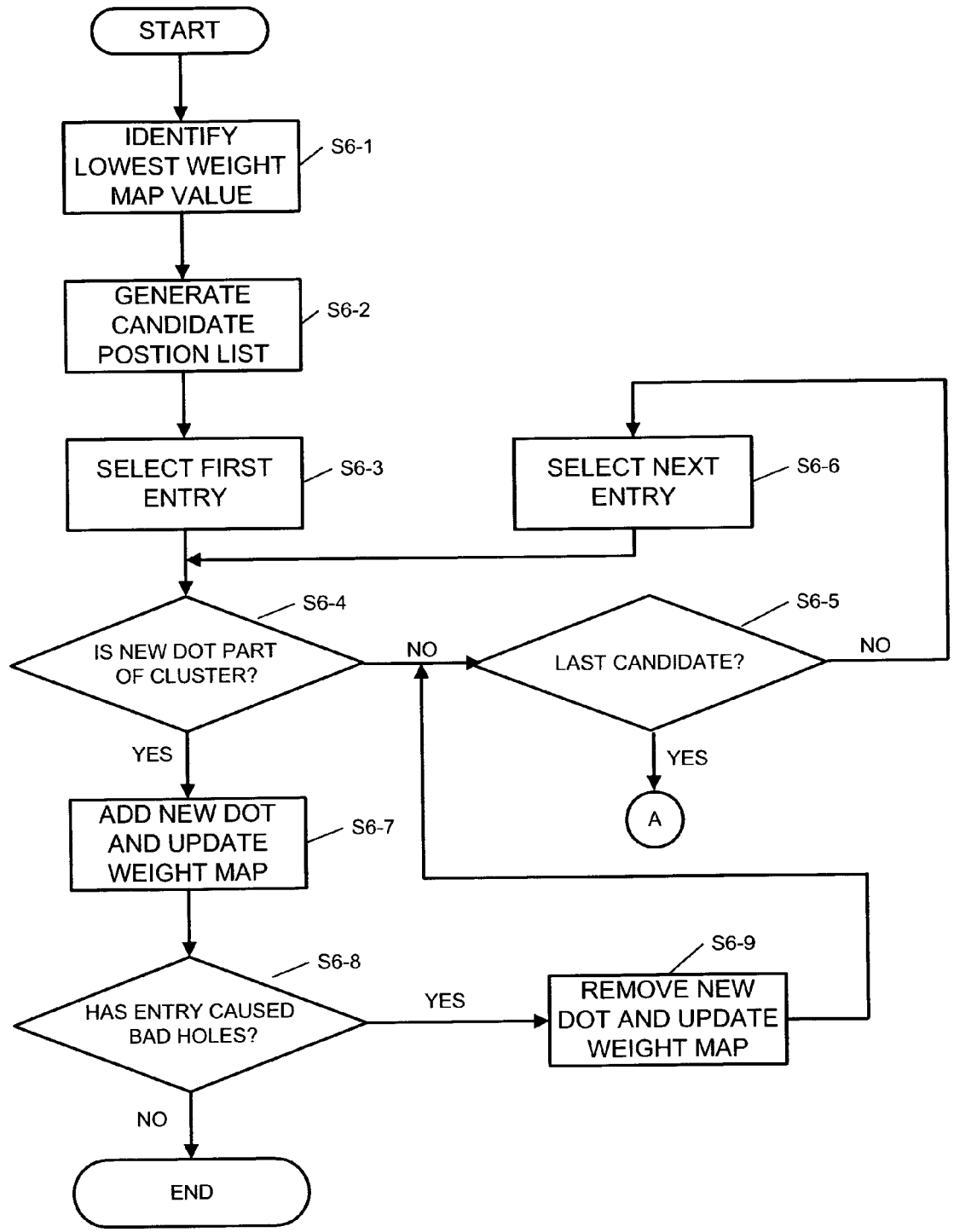
Figure 6B:
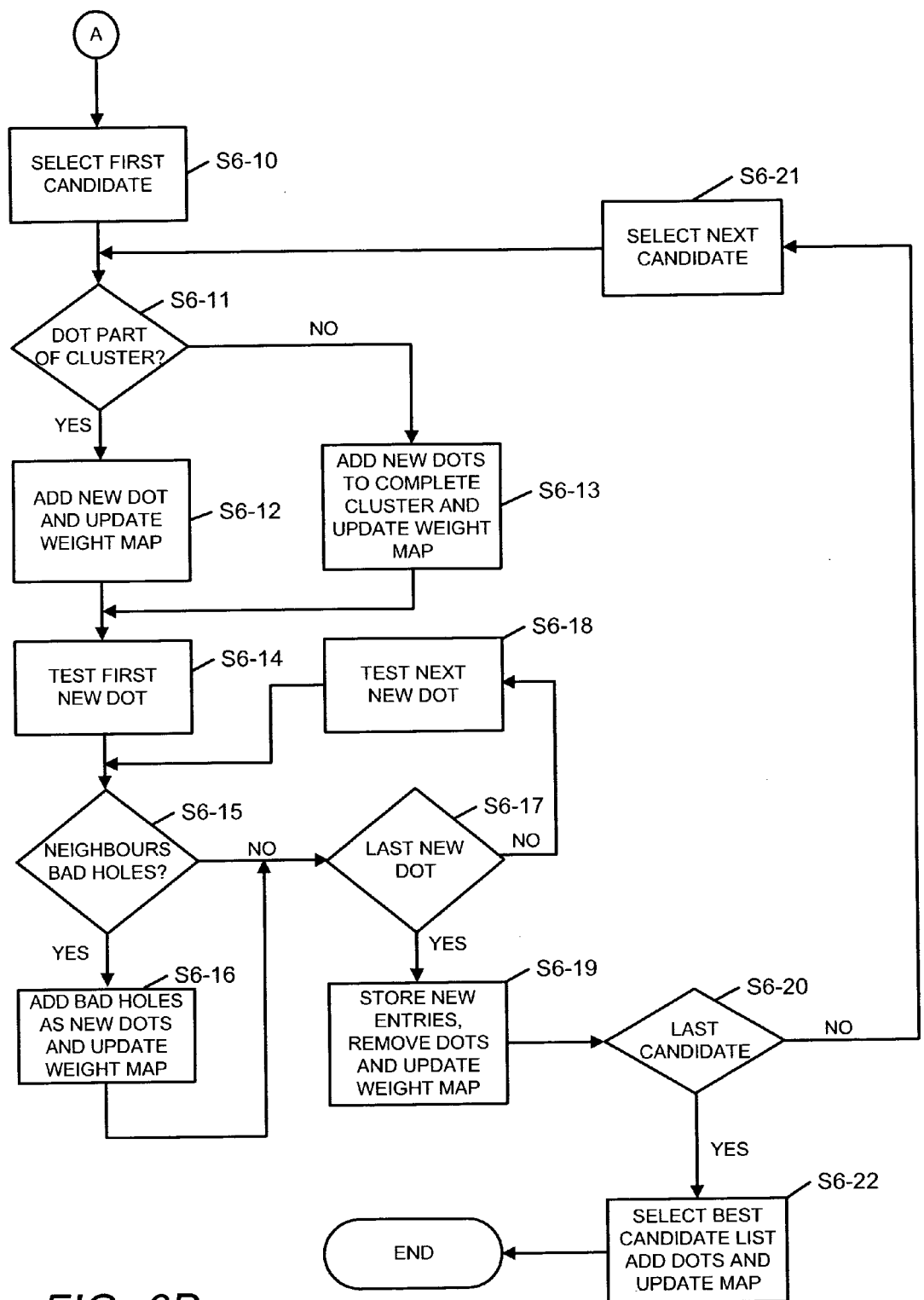

More specifically having amended one or more one entries in the bit mask in the working mask store, the mask generation module 40 then proceeds (s10-11) to utilize the bit mask stored in the working mask store 47 as a starting point and reinserts one or more one entries into the array using an algorithm to maximize the spread of one entries whilst avoiding the generation of isolated groups of one or zero entries in the same way as has previously been described in relation to FIGS. 6A and 6B.

The mask generation module 40 then determines (S10-12) whether the number of one entries in the array in the working mask store 47 equals or exceeds the number of one entries of the array stored in the current mask store 46. If this is not the case, the mask generation module 40 proceeds to amend (s10-11) one or more further zero entries in the array in the working mask store 47 before checking once again (s 10-12) whether the total number of one entries in the mask stored in the working mask store 47 equals or exceeds the number of one entries in the mask stored in the current mask store 46.

When it is determined that total number of one entries in the mask stored in the working mask store 47 equals or exceeds the number of one entries in the mask stored in the current mask store 46, the mask generation module 40 then (s10-13) checks if the total number of one entries in the two arrays are equal and abandons the attempt to improve the spread of one entries using the candidate for amendment if this is not the case.

If however, the reinsertion of one entries is determined (s 10-13) to have generated a mask in the working mask store 47 having the same number of one entries as the mask in the current mask store 46, the mask generation module 40 then (S10-14) determines the number of one entries from the bit mask for the previous level which are now represented by zeros in the array stored in the working bit mask store 49. If this number exceeds the threshold value of one entries which are permitted to be out of position for the current level as has previously been described in relation to step (S10-3) the potential amendment utilizing the current selected candidate for amendment is abandoned.

If this is not the case, at this point the mask generation module 40 will have stored in the working mask store 47 an alternative arrangement of one entries and zero entries to that stored in the current mask store 46 where both arrays include the same number of one entries. Further it will have been established that both arrangements are such not to include isolated groups of ones or zeros and the number of one entries for a bit mask for a previous level which are not included in the bit masks stored in the current mask store 46 and working mask store 47 is less than a threshold value. Finally the weight maps in the current and working weight map stores 48, 49 will reflect functions identifying for positions in the arrays the relative distance of points from one entries in the arrays of the current and working mask stores 46, 47 respectively.

The mask generation module 40 then proceeds to determine whether the alternative bit mask arrangement stored in the working mask store 47 is an improvement on the bit mask stored in the current bit mask store 46. This is achieved by calculating (S0-15) the difference between the weight values in the current and working weight maps stores 48, 49 for zeros entries in the bit mask in the current mask store 46 represented by one entries in the bit mask in the working mask store 47 and the sum of the weight values in the current and working weight maps stores 48, 49 of one entries in the bit mask in the current mask store 46 represented by zero entries in the working mask store 47. If (s10-16) this value is negative from the manner in which the weight maps stored in the working and current weight map stores 47, 48 are calculated, this indicates that the spread of one entries in the arrangement represented by the bit mask in the working mask store 47 is less well spread than the arrangement in the current mask store 46.

If, however, the calculated difference is positive (s10-16), the mask generation module 40 then (S10-17) proceeds to store the co-ordinates of the entries in the working mask store 47 which differ from the corresponding values for coordinates in the current mask store 46 together with this calculated difference in associated weight values for the arrangements.

After either the co-ordinates for entries to be amended and difference in weight values indicating an extent of improvement have been stored (S10-17) or alternatively after a candidate for amendment has been abandoned after either determining that the proposed amendments are liable to create isolated clusters of zero entries (s10-9) or the proposed alternative arrangement of one entries will either increase the total number of one entries in an arrangement (s10-13) or will excessively increase the number of one entries in a modified arrangement which are represented by zero entries in a bit mask for a previous level (s10-14) or alternatively after it has been determined that a proposed amendment does not result in an improved spread of one entries across a bit mask (s10-16), the mask generation module 40 then (S10-18) proceeds to reset the contents of the working weight map store 47 and working mask store 49 by copying entries from the current weight map store 48 and current mask store 46 into the working weight store 47 and working weight mask store 49 respectively.

The mask generation module 40 then (S10-19) determines whether all of the one entries in the bit mask arrangement stored within the current mask store 46 have been considered for amendment. If this is not the case the next one entry in the bit mask arrangement in the current mask store 46 is selected (S10-20) and the mask generation module 40 then proceeds to attempt to identify an improvement for the spread of one entries in the current mask store 46 which involves the modification of the selected entry (S10-2-10-19) in the manner of which has been described above.

Eventually the mask generation module will determine (s10-19) that the final one entry in the bit mask stored in the current mask store 46 has been reached. At this point (s10-21) the mask generation module 40 will have stored for all of the one entries whose modification gives rise to an improvement in the spread of one entries in a bit mask, data identifying entries in the current bit mask which have to be modified to give rise to the improvement together with a weight score value identifying the extent to which the spread of one entries is improved by the amendment.

If having processed all of the one entries in a bit mask array in the current bit mask store 46 no improvement data has been stored, this indicates that the mask generation module 40 was unable to improve upon the spread of one entries in the bit mask in the current mask store 46.

However, if data has been stored the modifications associated with the greatest improvement in the spread of one entries is then utilized (S10-22) to update the array the current mask store 46 by setting any one entries identified by the coordinates to zero entries and amending identified one entries to become zero entries. The weight map values within the current weight map store 48 are then amended to reflect the changes to the bit mask in the current mask store 46 by taking the co-ordinates of the modified entries in turn and updating the weight map values using these co-ordinates and the functions which have previously been described in relation to steps (S6-7 and S6-9) depending on whether an entry is being modified from a zero to a one or a one to a zero respectively.

The mask generation module 40 then proceeds to update the out of position list 50 by identifying the co-ordinates of entries in the bit mask in the current bit mask store 46 where a zero entry corresponds to a one entry in the bit mask of the immediately previous level.

The mask generation module 40 then (S10-23) determines the time taken to date to process the bit mask being generated. In this embodiment in order to prevent an endless loop of modifications the total time spent smoothing a bit mask for a particular level is limited to a threshold value which is set by a user dependent upon the speed and processing power of the bit mask generator computer 1 being used. If the time limit for smoothing has not been reached, the mask generation module 40 proceeds to select the first one entry in the bit mask array (S10-1) before attempting to modify the arrangement of ones in the array to improve the overall positioning of those ones (S10-2-S10-22).

If the time limit for smoothing the current level has been reached or alternatively when no further improvements in the arrangements of ones in the array can be identified the processing of the mask generation module 40 for optimizing the positions of ones in the bit mask for that level ends.

As a result of the processing of the generated bit mask, a bit mask having a spread of ones within the array is generated. Because of the smoothing operation, the order in which new ones are added to an array for a particular level is not relevant as the selection of suitable positions is reassessed after all new ones have been added to the array.

The processing of the array also ensures that contouring which arises from the use of the bit mask arrays is kept to an acceptable level. Comparing the output patterns for adjacent grey levels, only a limited number of dots in a first level will not be represented in the second. Specifically in the case of the first 16 grey levels an additional 4 dots will appear in each successive level. In the case of subsequent grey levels 4 additional dots will appear in each successive level and the positions of up to 4 further dots may be modified between levels. Since the majority of dots appear in the same positions in successive levels the arrangement of dots in outputs for successive grey levels should be pleasingly arranged as the dots in each output are evenly spread amongst themselves and will have a significant number of dots in common.

Finally the processing of the array also ensures that a bit mask is generated which does not include any excessively small groups of one entries or zero entries which may be unreliably rendered by a laser printer.

Returning to FIG. 4, after the smoothing operation performed by the mask generation module 40 has been completed the mask generation module 40 then (S4-5) stores a copy of the generated bit mask in the bit mask store 54. The mask generation module 40 then (S4-6) determines whether 256 bit masks for 256 different grey levels have now been stored in the bit mask store 54. If this is not the case the mask generation module 40 proceeds to clear the out of position list 50 and the new dot list 52 (S4-7) before calculating a new bit mask for the next of grey level (S4-2-S4-5).

Thus in this way the mask generation module 40 proceeds to generate a set of 256 masks each of which is stored within the bit mask store 54. Each successive bit mask is generated utilizing the previous level's bit mask and weight map and hence the generation of each level's bit mask takes into account the bit masks of previous levels. When a complete set of bit masks is determined to have been generated, (S4-6) the stored bit masks are then passed to the compression module 9 for compression as will now be described in detail with reference to FIGS. 11-13.

(iii) Compression of Generated Bit Masks

FIG. 11 is a block diagram of the compression module 9 in this embodiment. In this embodiment the compression module 9 comprises a bit mask store 54 being the same bit mask store 54 utilized by the generation module 3; a line mask store 56; an exclusive or processor 58; a exclusive or line mask store 60; a run length encoder 62 and a compressed data store 64.

In this embodiment when a set of bit masks in the form of 256 32 by 32 arrays of ones and zeros are stored within the bit mask store 54, the compression module 9 proceeds to process the bit masks initially generating (S4-8) a set of line masks which are stored in the line mask store 56. The compression module 9 then processes the generated line masks in the line mask store 56 utilizing an exclusive or processor 58 to generate a set of exclusive or line masks which are stored within the exclusive or line mask store 60. Finally the data stored within the exclusive or line mask store 60 is processed utilizing a conventional run length encoder 62 to generate (S4-9) compressed data which is initially stored in the compressed data store 64 and then recorded (S4-10) on to a CD ROM 10 so that the compressed data can be incorporated in a printer driver.

The processing of the compression module 9 will now be described in detail with reference to FIGS. 12 and 13.

FIG. 12 illustrates data stored within the bit mask store 54, line mask store 56, exclusive or line mask store 60 and compressed data store 64.

In this embodiment initially the data stored within the bit mask store 54 comprises a set of 256 32 by 32 bit mask arrays. Each of these arrays comprises a 32 by 32 binary array where the first level bit mask consists entirely of zeros entries and the 256th level bit mask comprises entirely one entries and the intermediate levels contain increasing numbers of ones in their arrays.

As will be described in detail later when the bit masks are utilized to convert a multi-level image into a half-tone image multi-level image data is processed line by line. The compression module 9 therefore initially gathers together all the data from the different bit masks in the bit mask store 54 which is relevant for processing each individual line of data.

That is to say the compression module 9 copies the first 32 bits of data from the bit mask for the 256th level bit mask as the first 32 bits of data for the first line mask. The compression module 9 then identifies the first 32 bits of data for the 255th level bit mask. This is stored as a second 32 bits of data in the bit mask store. This operation is repeated until the first 32 bits of data from the 1st level bit mask is stored as the 256th group of 32 bits of data in the line mask store 56.

The compression module 9 then proceeds to copy the second group of 32 bits of data from each of the 256 level bit masks in the bit mask store 54. Thus in this way the line mask store 56 has cause to be stored within it 32 sets of data each comprising 256 32 bit numbers where the nth 32 bit number in the mth set of line mask data corresponds to the mth 32 bit number of the (256-n)th bit mask from the bit mask store 54.

The reordering of data in this way means that in contrast to the 256 bit masks in the bit mask store 54 where the ratio of ones to zeros in each bit mask increases for each level, the sets of data in the line mask store 56 comprises 32 sets of data where the number of zeros in each group of 32 bits of data in the set gradually increases from zero in the first 32 bits to all 32 entries in the group being zero in the 256th group of 32 bits.

FIG. 13A is an exemplary illustration of a section of data stored within the line mask store 56. As can be seen from FIG. 13A in the line masks stored within the line mask store 56 as a result of this reordering the one entries in the array form columns where the same value one is copied between different bit masks for different grey levels. A new column of ones is started when a new one is added to a particular level and continues through successive levels if the one was not subsequently modified in the smoothing process. Where a particular one entry was moved in the smoothing process performed in generating different bit masks the column of ones ends.

When all the data from the bit mask store 54 has been copied in to the line mask store 56 the compression module 9 invokes the exclusive or processor 58 to utilize the data within the line mask store 56 to generate exclusive or line mask data which is stored in the exclusive or line mask store 60.

Specifically the exclusive or processor 58 initially takes the first 32 bit number represented from the line mask store 56 and performs an exclusive or operation on that number with a 32 bit number comprising 32 ones. That is to say the exclusive or processor 58 performs a bit wise exclusive or operation on each of the 32 bits of the 32 bit number with a second 32 bit number consisting of 32 ones as set out on the following truth table:

| Input A | Input B | Output |
|---------|---------|--------|
| 0 | 0 | 0 |
| 1 | 0 | 1 |
| 0 | 1 | 1 |
| 1 | 1 | 0 |

The result of the exclusive or operation is then stored as the first 32 bits of data within the exclusive line mask store. The exclusive or processor 58 then selects the next 32 bits of data from the line mask store 56 and performs an exclusive or operation on this 32 bit number and the first set of 32 bits of data from the first line bit mask. The result of this exclusive or operation is then stored as the second 32 bits of data within the exclusive or line mask store 60. This operation is then repeated for the second and third 32 bits of data and then for each of the subsequent pair of 32 bits numbers from the first line bit mask. The same processing is then carried out on the data from each of the subsequent sets of line bit mask in the line mask store 56.

The result of the processing by the exclusive or processor 58 is illustrated by FIG. 13B. Comparing 13A and FIG. 13B the processing by the exclusive or processor is such to generate a sparsely filled array of zeros and ones where each of the ones indicates where a column of ones in the data stored in the line mask store 56 begins or ends.

The compression module 9 then causes the run length encoder 62 to be invoked. The run length encoder 62 proceeds to process the data stored within the exclusive or line mask store 60 in a conventional manner by determining the number of zeros which separate each of the ones in the data stored in the exclusive line mask store 60. Thus for example as is illustrated by FIG. 13C the array of numbers in FIG. 13B would be converted into a set of numbers shown in FIG. 13C. This data is then stored in the compressed data store 64.

The reordering of data in the form of bit masks into line masks which are stored in the line mask store 56 does not reduce the size of the representation of the bit mask. However the combination of performing an exclusive or operation and subsequently utilizing run length encoding reduces the total amount of data for storing by approximately a factor of 10. This is because in the majority of cases a one present in one level will be represented by a one in the next level and similarly a zero present in one level is represented by a zero in the next level. The result of processing by the exclusive or processor is therefore a sparsely filled array and hence an array which can be significantly compressed by run length encoding. The compressed data is then recorded onto a CD ROM 10 which is passed to a printer driver generator computer 2 so that the compressed data can be incorporated in a printer driver 25, 30.

Use of Compressed Bit Masks in Printer Drivers

The use of compressed data in a printer driver 25, 30 generated in accordance with the present invention will now be described with reference to FIGS. 14-20.

FIG. 14 is a block diagram of a host computer 3 in accordance with this embodiment of the present invention. Stored within the main memory of the host computer 3 is a document generator program 27 for example a word processing program and a printer driver 25. In addition the client computer also comprises a microprocessor 80 for processing data, a cache memory 82 which is accessible by the processor 80 and a page memory 84 storing data recently utilized by the processor 80.

In this embodiment the printer driver 25 comprises a text processor 86 being a text driver 11 selected by the printer driver generator computer 2 incorporated in the printer driver 25 and an image processor 88 being a picture driver selected from the picture drivers 13 by the printer driver generator computer 2.

The image processor 88 includes compressed bit mask data 92 being data recorded by the bit mask generator computer 1 on to a CD ROM 10 and incorporated in to an image processor 88 by the printer driver generator computer 2. The image processor 88 also includes a decompressor module 94 for generating a set of line bit masks from the compressed data 92, a decompressed line mask store 95, a raw image store 96 for storing image data received from the document generator 27 and a half-tone image data store 98 for storing half-tone data generated by the image processor 88. The printer driver 25 also includes a settings data store 99 for storing the current selected configuration for the printer 28 (not shown in FIG. 14) to which the host computer 3 is connected.

Referring to FIG. 15 the operation of the host computer 3 for generating half-tone image data will now be described.

Initially (S15-1) the host computer 3 utilizes the document generator program 27 to generate a document that is to be printed. Such a document could be of the form of a word processed document, an image or alternatively a document comprising both text and image data.

After a document file has been generated the host computer 3 (S15-2) determines whether a user has indicated that a generated document is to be printed. If this is the case the host computer 3 invokes the printer driver 25 to convert the generated document file into half-tone image data 98.

Specifically the printer driver 25 initially checks (S15-3) the settings data 99 to determine the current selected settings for the printer 28 which is to be utilized to out put a printed image 29. Thus for example the settings data 99 might indicate a particular printing density which is to be utilized. After checking the settings data 99 the printer driver 25 proceeds to select compressed bit mask data 92 to be utilized to convert a raw image data into a half-tone image.

Specifically the compressed bit mask data 92 corresponding to a set of bit masks for a particular printer setting are identified by the printer driver 25. This data will comprise run length encoded data which has previously been generated by the compression module 9 of the bit mask generator computer 1.

An example of a portion of run length encoded data is illustrated by FIG. 16A. The decompressor module 94 of the printer driver 25 is then (S15-4) invoked which initially utilizes the run length encoded data to generate exclusive or bit mask data.

This is achieved by the decompressor 94 generating an array of zeros and ones where each line contains 32 entries which is stored in the compressed line mask store 95. Taking the items of run length encoded data in turn, the decompressor includes in the array being generated a series of zeros corresponding to the first number in the run length encoded data. After this number of zeros has been included in the array the next entry in the array is set to one. The next item of run length encoded data is then processed. Again a number of entries corresponding to the next item of run length encoded data are set to zero in the array and then a further entry is then set to one.

FIG. 16B is an example of a portion of a 32 by 32 array generated and utilizing the run length encoding data shown in FIG. 16A.

The generated data stored in the decompressed line mask store 95 is then processed by the decompressor 94 by performing an exclusive or operation on the final 32 bits in decompressed data with a 32 bit binary number consisting entirely of zeros of data. The result of this exclusive or operation is stored and then an exclusive or operation performed on this number and the next set of 32 bits in the array and that result is stored. This is then repeated for each successive 32 bits until the first set of 32 bits is reached in each group of 256 32 bit numbers.

The result of this processing on the array of FIG. 16B is shown in FIG. 16C. The effect of the processing is to convert the decompressed data in the decompressed line mask store 95 into a set of 32 line bit masks as previously existed in the line mask store 56 of the compression module 9 of the bit mask generator 1 when the bit masks were originally created as was illustrated in FIG. 12. That is to say in this embodiment stored within the decompressed line mask store are 32 sets of line masks each comprising 256 32 bit numbers, where the first line of each set consist a 32 bit number consists entirely ones and the 256th 32 bit number consists entirely of zeros and intermediate numbers share generally gradually increasing numbers of zeros.

Returning to FIG. 15 the printer driver 25 then (S15-5) determines whether the document file which is the portion of the document file which is being printed comprises text data or image data. If the portion of the document being processed comprises text data the text processor module 86 is invoked and is utilized (S15-6) to convert the text data into image data in an conventional manner.

If, instead, the portion of the document file being processed represents an image the image processor module 88 is invoked and utilized (S15-7) to generate half-tone data as will be described in detail later. When half-tone data has been created either by the text processor 86 or the image processor 88 this data is passed to the printer 28 which (S15-8) utilizes the half-tone data to print a half-tone image by recording dots of toner whenever a one is represented within the generated half-tone data.

Conversion of Multi-Level Data Utilizing Generated Line Masks

The conversion of multi-level image data into half-tone data by the image processor 88 utilizing a decompressed line mask will now be described with reference to FIGS. 17-20.

When the image processor module 88 is first invoked (S17-1) the image processor 88 initially extracts a line of image data from the raw image data 96 for processing.

FIG. 18 is an example of a portion of multi-level image data representing an image. In the example of FIG. 17 the first line of image data comprising the multi-level image data 154, 153, 153, 154, 153, 154, 20, 15 . . . would be extracted by the image processor 88. Conventionally, these numbers will range from 0 to 255 where 0 is indicative of black and 255 is indicative of white.

Next, the image processor 88 proceeds (S17-2) to load a line mask for the current line into the page memory 84 of the host computer 3. In the case of the first line of an image; the first set of line masks being 256, 32 bit numbers is loaded in to the page memory 84.

The first pixel in the line of multi-level image data processor is then (S17-3) selected. In the case of the example of FIG. 18 this would be the number 154 in the position (1,1) in the array of FIG. 17.

The image processor 88 then compares (S17-4) this number with the value which was immediately previously utilized. If this value is not equal to the value previously utilized the image processor then (S17-5) causes the n+1th 32 bit number from the page memory 84 to be stored within the cache memory 82 where n is equal to the value of the multi-level pixel being considered. Thus in the case of processing a multi-level data set to zero indicative of black, the first 32 bit number comprising a series of ones would be retrieved.

FIG. 19 is an example of a 32 bit number stored within the cache memory 82.

The image processor 88 (S17-6) proceeds to utilize the x co-ordinate for the multi-level data being processed to identify one of the entries in the 32 bit number stored within the cache memory 82. More specifically the printer driver 25 stores a co-ordinate value which is incremented each time a pixel is processed and is reset to zero after every 32 pixels have been processed. This will be equal to the current x co-ordinate in modulo 32 arithmetic.

The image processor 88 then utilizes this current x co-ordinate value modulo 32 to identify an entry within the 32 bit number stored within the cache memory 82. This will either be a zero or a one and this value is added to the half-tone image data 98 for the line which is currently being generated.

Next the image processor 88 (S17-7) then determines whether the last pixel in the line of image data being processed has been reached. If this is not the case (S17-8) the current counter for the current position along the line is incremented and the next item of multi-level image data is then identified and utilized (S17-4-17-5) to select a 32 bit number from the page memory 84 and store that in the cache memory 82 and then utilize the stored 32 bit number to convert the multi-level data into half-tone data.

When the final entry of multi-level pixel data of a line being processed has been reached the half-tone data 98 for the line is output (S17-9) by the printer driver 25 to the printer 29 where it can be utilized to generate a line of image of printed image by printing an area of toner each time a one is encountered in the image data.

The image processor 88 (S17-10) determines whether the final line of multi-level pixel data has been processed. If this is not the case the next line of raw image data 96 is identified (S17-11) and the data within the page memory 84 is over written with the next set of line mask data in the next set of 256 32 bit numbers from the decompressed bit mask data (S17-1-17-2) before the new set of image data is utilized to generate multi-level data into half-tone data (S17-4-S17-9).

By storing and utilizing line mask data the number of memory operations converting a line of raw image data 96 into half-tone image data is reduced. Specifically, for each line of image data a single set of line mask data being 256 32 bit numbers is transferred to the page memory 84. This set of data is utilized to convert all the image data for an entire line of multi-level data into half-tone data.

Only when an entire line is processed is further data written to the page memory. This contrasts with conventional bit mask processing where a different 32 by 32 bit mask would be accessed each time a pixel of a certain grey level was to be printed.

FIG. 20 is an illustrative example of the portion of multi-level data illustrated by FIG. 18 after it has been converted into half-tone data. As can be seen by comparing FIG. 20 and FIG. 18 in general where a low level of multi-level image data appears for a pixel which is indicative of a dark color most of the corresponding half-tone values are set to one. In contrast for higher multi-level image data indicative of a light color most of the corresponding half-tone data values are equal to zero. Whether a specific pixel is converted to a zero or one however depends upon both the position of the pixel, the multi-level value for that pixel and the generated bit mask data utilized to convert multi-level image data to half-tone data.

The printer driver 30 of a digital copier 4 generated by the printer driver generator computer 2 works in a similar manner to the printer driver 25 stored on a host computer 3 except as the digital copier is arranged to process only scanned in images which will be represented in the form of multi-level image data the printer driver 30 for a digital copier 24 does not require a text processor for processing text documents.

FURTHER MODIFICATIONS AND EMBODIMENTS

Although in the above embodiment a single function is utilized to generate data which is stored in the weight mask store 42 of a generation module 8 different functions could be utilized for generating weight maps for different levels. More specifically in the case of generating weight maps for bit mask associated with array consisting predominately of zeros, a function which depends upon distance which drops to zero after a longer distance could be utilized and for levels of bit mask data including greater numbers of ones in the bit mask arrays a function that drops to zero more rapidly and hence caused values to be generated based on smaller neighborhoods of the arrays could be utilized.

Although in the above embodiment the function used to calculate weight values is inversely proportional to a Euclidian distance between a particular point and portions of the array containing one values, other functions could be utilized. In particular instead of having a function proportional to $$(\delta x^2 + \delta y^2)^{1/2}$$

where $\delta x$ l is the distance between two points along the x axis and $\delta y$ is the distance between two points on the y axis, any suitable function could be utilized for example $$(\delta x^n + \delta y^n)^{1/n}$$

where n is a selected value could be utilized.

Alternatively a more complex function such as $$(\max(\delta x, \delta y)^n + \min(\max(\delta x, \delta y) - 0.1 \min(\delta x, \delta y), \min(\delta x, \delta y))^n)^{1/n}$$

where max and min are maximum and minimum functions respectively or $$e^{-\left(\frac{\delta x^2 + \delta x^2}{R^2}\right)}$$

where R is the radius of and area to be affected by inclusion of a one entry could be used.

In the above embodiment, a bit mask generation system is described in which where bit masks including isolated one entries and zero entries are prevented from being generated by ensuring that isolated entries form part of a larger cluster of entries where the smallest clusters comprise patterns illustrated in FIG. 7. It will be appreciated in other embodiments, a different set of minimum clusters could be used.

Thus for example in an alternative embodiment a bit mask generation system could comprise a system where clusters comprising pairs of adjacent one or zero entries were permitted. Alternatively, the system could be arranged to generate bit mask arrays in which the smallest clusters comprised groups of four or more zero or one entries.

In the above description where a bit mask array is modified to create a cluster of zero or one entries, the selection of modification to make is based upon the number of modifications involved, a weight score and where two modifications involve changing the same number of entries and are associated with the same weight score, reference is made to a random number table. In other embodiments other factors could be utilized to choose between two potential modifications. In particular, in cases where the vertical and horizontal axes of dots of toner generated by a printer are not equal, the bit mask generation system could be arranged to select as a preferred modification, modifications which result in more compact arrangements of toner on a page.

Thus for example, in the case of a printer in which dots of toner extend twice the distance in a vertical direction that they extend in the horizontal direction and in which bit masks comprising at least pairs of one entries or zero entries where being generated, the system could be arranged to select pair of adjacent entries adjacent in the horizontal direction over pairs adjacent in a vertical direction. In this way the system would be arranged to generate bit masks which favored the generation of images comprising 2 by 2 square of toner or blank areas rather than bit masks which generating images represented by a long thin 4 by 1 rectangles of toner or blank areas More generally any arrangement of one or zero entries could be associated with a value indicating the size of a resultant area of toner (or unprinted area) generated by printing out the arrangement and the bit mask generation system could be arranged to favor the selection of bit mask arrays which lead to the generation of more compact arrangements of toner (or unprinted paper).

In the above embodiment, a system is described in which a candidate entry for modification is considered to extend a pre-existing cluster of one entries if horizontally or vertically adjacent entries in an array are one entries are part of a pre-existing cluster of entries of that type, it will be appreciated that in other embodiments, candidates for amendment diagonally adjacent to entries forming a pre-existing cluster of one entries might be considered to be allowable amendments.

As a further alternative, a bit mask generation system could be provided which generated bit masks where every one or zero entry in a bit mask was required to be part of a cluster of bit masks of the types illustrated in FIG. 7. In such a system zero and one entries which merely extended a pre-existing cluster would not be permitted to be modified if such a modification did not generate a new cluster. The advantage of such a system would be that clusters of zero and one entries would be more compact than the patterns of zero and one entries generated by the system of the described embodiment which might be advantageous for certain laser printers.

Further although for the reasons previously described the bit masks generated in accordance with the present invention are particularly suitable for use in printer drivers and printing systems for laser printers, it will be appreciated that as the generated bit masks give rise to bit masks which generate pleasing arrangements of dots for representing shades, the bit mask could also be utilized in other printing systems for example inkjet printing systems.

Although in the above embodiment an entire set of compressed bit masks is described as being decompressed when printing is to occur, it will be appreciated that selected portions of a set of bit masks could be compressed at different times. More specifically, for each line of a multi-level image being processed, bit mask data for processing only that line might be decompressed and utilized to convert multi-level data into binary half-tone data. When the next line of multi-level data was to be processed, the bit mask data for processing that next line would then be decompressed. In this way the total amount of memory for storing bit mask data could be minimized as each time bit mask data for processing a particular line of an image was decompressed, it could be stored in the same memory locations as previously stored the bit mask data for processing the previous line of image data.

Although in the above embodiment 32 by 32 bit mask arrays are described as being generated, it will be appreciated that any suitable size or shape of array could be generated by configuring the random number table 44, the current mask store 46, the working mask store 47, the current weight map store 48 and the working weight map store 49 to store arrays of the desired size.

In the above embodiment a system is described in which the position of any one entry can be modified at any time provided the total number of one entries which are not represented in an immediately previous bit mask does not exceed a preset limit. In the described embodiment, at each iteration the allowable modifications which result in the greatest improvement in the spread of ones and zeros in the bit mask are made. The modification of positions proceeds until no improvement in the spread of ones and zeros is achieved, or a maximum number of iterations have been performed.

Problems with contouring arise when dots printed for a lighter shade are not represented in patterns of dots for printing a darker shade. Each time a one entry which is represented in an immediately previous bit mask is moved, this therefore increases the potential amount of contouring. In contrast, modifying the position of one entries which are not represented in an earlier bit mask will not increase the amount of contouring as the number of dots printed in the darker shade which are not represented in a lighter shade will not be increased. Modifying positions of one entries which are not represented in an immediately previous bit mask can however result in an improvement in the overall spread of ones and zeros in the bit mask.

In an alternative embodiment, more complicated rules for selecting entries for modification could therefore be used to further restrict contouring. Thus for example the modification of the positions of one entries could be restricted so as only to occur when the modification significantly improved the overall spread of one entries in the array. This could be achieved by monitoring a measure of the improvement in spread and only allowing changes to existing one entries whilst the improvement exceeded a threshold. A suitable measure might be that the weight associated with a proposed new location for an existing one entry was at least 1% lower than the weight associated with the current location of the existing one entry. When the improvement in spread was found to be less than the threshold, modification of one entries could then be restricted to the one entries which did not correspond to a one entry in the previous level.

An alternative system could take advantage of the fact that in the described embodiment, modifications resulting in the greatest improvements in spread are selected to occur first. In a modified system for further reducing contouring existing one entries could be allowed to be moved only if no new entries for that array had been modified. As the new entries for each array are positioned at what are considered good initial locations, modifying the positions of new entries generally causes only a minor improvement in the spread of one entries in an array. However, since such modifications do not increase contouring it is sensible to optimize the position of all of these new entries. By only permitting modification of existing entries selected before any new entry is selected for modification, a flexible threshold for permitting changes to the positions of existing one entries is provided which is set at the level of the possible improvements in spread arising from possible changes in the locations of new entries for an array.

Although, the above described embodiment refers to grey level data, it will be appreciated that the present invention is equally applicable to color printing. In the case of color printing instead of a single multi-level image, three or more multi-level images are used to represent each image, one for each color to be printed. These multi-level images can be processed separately utilizing the bit mask data in the manner described to generate a set of half-tone images, one for each color to be printed. The half-tone images would then be printed on top of each other to output a single color image.

Preferably in the case of bit masks for color images different bit mask data is utilized to generate half-tone data for each color so that the spread of dots in the final output image is visually pleasing. In order to generate such a set of bit masks a more complicated weighting function which accounts for the representations of all colors could be used.

Alternatively for color images a single set of bit masks could be used for all the colors. In such a system it would be desirable to process the coordinates for multi-level data so as to offset the use of the bit masks for different colors. Thus for example in the case of a pixel of co-ordinates x, y, whether or not to print in one color would be determined by checking the xth entry of the line mask for the yth line and for other colors the x+$\epsilon$th entry of the line mask for the y+$\delta$th line where $\epsilon$ and $\delta$ offsets which differ for the different colors.

Although in the above described embodiment a system is described which if possible generates a gap or a single dot of toner for each pixel of multilevel image data, it will be appreciated that the resolution of an output image could be less than or greater than an original multilevel image. In the case of an output image having a lower resolution than an original multilevel image, an averaged multilevel data value for a block of pixels in an original image could be used to select a bit mask for converting the image into a half-tone image. Conversely, in the case of an output image having a higher resolution than an original multi-level image the multilevel data value for a pixel could be used to identify a block of bit mask data for representing the corresponding area in the output image.

Although in the above embodiment, reference is made to printer drivers, it will be appreciated that the described invention is equally applicable to any form of half-tone image processing utilizing bit masks. Thus for example the present invention is applicable to hardware or software raster image processors and half-tone processing performed within printers themselves.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier can be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the intergrated circuit being adapted for performing, or for use in the performance of, the relevant processes.

The invention claimed is:

1. An image processing apparatus for converting multi-level image data into half-tone image data comprising:
   a receiver for receiving items of multi-level image data, said items of multi-level image data associating positions in an image with a respective one of a range of shades;
   a bit mask store storing data representative of a set of binary bit mask arrays, each of said arrays being associated with a respective shade of said range of shades, the entries in said arrays defining a pattern of dots and gaps for representing said associated shade; and
   a conversion unit operable to convert an item of multi-level image data into half-tone image data by:
   selecting the bit mask array associated with the shade for an item of multi-level image data being converted;
   identifying one or more entries in said selected bit mask utilizing the position identified by said item of multi-level data; and
   outputting said one or more identified entries in said bit mask array as half-tone data for said position,
   wherein the entries in the binary bit mask arrays defined by data stored in said bit mask store are distributed so as to maximize a distance function dependent upon the spread of entries of the same type in each bit mask array subject to the entries being arranged such that each entry forms part of a cluster of two or more adjacent entries of the same type within said array or is adjacent to an entry of the same type which forms part of a cluster of entries of the same type in said array, the entries at the edges of a binary bit mask array being adjacent to corresponding entries at the opposite edge of the binary bit mask array
   wherein the binary bit mask arrays associated with at least some pairs of consecutive shades in the mid range of said range of shades are such that the majority but not all of the pattern of dots defined by a bit mask array of said pair for a lighter shade is included as a subset of the pattern of dots defined by a bit mask for the darker shade of said pair.

2. An image processing apparatus in accordance with claim 1 wherein the entries in the binary bit mask arrays defined by data stored in said bit mask store are arranged so that each entry is adjacent at least one other entry of the same type within said array.

3. An image processing apparatus in accordance with claim 1 wherein the entries in the binary bit mask arrays defined by data stored in said bit mask store are arranged such that each entry forms part of a cluster of three or more adjacent entries of the same type within said array or is adjacent to an entry of the same type which forms part of a cluster of three or more entries of the same type in said array.

4. An image processing apparatus in accordance with claim 3 wherein said clusters of entries comprise three entries of the same type, said entries being arranged within an array defined by data stored in said bit mask store so that two of said entries comprise entries immediately adjacent a third entry of the same type, wherein said two of said entries comprise entries of said same type at positions immediately vertically adjacent and immediately horizontally adjacent to the position in said array of said third entry of said same type.

5. An image processing apparatus in accordance with claim 3 wherein an entry in said array is adjacent to an entry of the same type forming part of a cluster of entries of said type if said entry at a position in said array diagonally adjacent to an entry of the same type forming part of a cluster of entries of the same type.

6. An image processing apparatus in accordance with claim 3 wherein an entry in said array is adjacent to an entry of the same type forming part of a cluster of entries of said type if said entry at a position in said array immediately vertically adjacent or immediately horizontally adjacent to an entry of the same type forming part of a cluster of entries of the same type.

7. An image processing apparatus in accordance with claim 3 wherein entries in the binary bit mask arrays defined by data stored in said bit mask store are arranged such that each entry forms part of a cluster of three or more adjacent entries of the same type within said array.

8. An image processing apparatus in accordance with claim 1, wherein the number of corresponding entries which differ between pairs of binary bit mask arrays associated with consecutive shades is less than a threshold value for all of said arrays for which data is stored in said bit mask store.

9. An image processing apparatus in accordance with claim 1 wherein said binary bit mask arrays each comprise an n by m array of entries wherein said conversion unit is operable to select as an entry in a selected bit mask for a position associated with coordinates x, y, the entry at position x modulo n, y modulo m in said selected bit mask.

10. An image processing apparatus in accordance with claim 1 wherein said bit mask store stores data representative of a set of binary bit mask arrays, wherein bit mask data for processing items of multi-level data for different shades in the same line of a multi-level image are stored in consecutive memory locations.

11. An image processing apparatus in accordance with claim 10 wherein said bit mask store stores data comprising a plurality of sets of data each set of data comprising a number of binary numbers corresponding to the number of shades of said range of shades wherein each of said sets of data comprises data for processing a line of a multi-level image, said conversion unit being operable to select a binary number from a group of numbers for a line of multi-level image data being processed on the basis of the shade represented by an item of multi-level image data being processed.

12. An image processing apparatus in accordance with claim 10 wherein said conversion unit further comprises a counter for counting the number of items of multi-level data in a line of multi-level image data being processed said conversion unit being operable to output as half-tone data for an item of multi-level data, an entry of a binary number selected on the basis of said multi-level value for said multi-level pixel selected utilizing the current value for said counter.

13. An image processing method for converting multi-level image data into half-tone image data comprising:
- receiving items of multi-level image data, said items of multi-level image data associating positions in an image with a respective one of a range of shades;
- storing data representative of a set of binary bit mask arrays, each of said arrays being associated with a respective shade of said range of shades, the entries in said arrays defining a pattern of dots and gaps for representing said associated shade; and
- converting items of multi-level image data into half-tone image data by:
- selecting the bit mask array associated with the shade for an item of multi-level image data being converted;
- identifying one or more entries in said selected bit mask utilizing the position identified by said item of multi-level data; and
- outputting said one or more identified entries in said bit mask array as half-tone data for said position,
- wherein the entries in the binary bit mask arrays defined by stored data are distributed so as to maximize a distance function dependent upon the spread of entries of the same type in each bit mask array subject to the entries being arranged such that each entry forms part of a cluster of two or more adjacent entries of the same type within said array or is adjacent to an entry of the same type which forms part of a cluster of entries of the same type in said array, where the entries at the edges of a binary bit mask array are considered adjacent to corresponding entries at the opposite edge of the binary bit mask array,
- wherein the binary bit mask arrays associated with at least some pairs of consecutive shades in the mid range of said range of shades are such that the majority but not all of the pattern of dots defined by a bit mask array of said pair for a lighter shade is included as a subset of the pattern of dots defined by a bit mask for the darker shade of said pair.

14. A method in accordance with claim 13 wherein storing data representative of a set of binary bit mask arrays comprises storing data defining bit mask arrays in which the entries in the defined binary bit mask arrays are arranged so that each entry is adjacent at least one other entry of the same type within said array.

15. A method in accordance with claim 13 wherein storing data representative of a set of binary bit mask arrays comprises storing data defining bit mask arrays in which entries are arranged such that each entry forms part of a cluster of three or more adjacent entries of the same type within said array or is adjacent to an entry of the same type which forms part of a cluster of three or more entries of the same type in said array.

16. A method in accordance with claim 15 wherein storing data representative of a set of binary bit mask arrays comprises storing data defining bit mask arrays in which clusters of entries of the same type comprise two entries comprise entries immediately adjacent a third entry of the same type, wherein said two of said entries comprise entries of said same type at positions immediately vertically adjacent and immediately horizontally adjacent to the position in said array of said third entry of said same type.

17. A method in accordance with claim 15 wherein an entry in said array is adjacent to an entry of the same type forming part of a cluster of entries of said type if said entry at a position in said array diagonally adjacent to an entry of the same type forming part of a cluster of entries of the same type.

18. A method in accordance with claim 15 wherein an entry in said array is adjacent to an entry of the same type forming part of a cluster of entries of said type if said entry at a position in said array immediately vertically adjacent or immediately horizontally adjacent to an entry of the same type forming part of a cluster of entries of the same type.

19. A method in accordance with claim 15 wherein storing data representative of a set of binary bit mask arrays comprises storing data defining bit mask arrays in which entries are arranged such that each entry forms part of a cluster of three or more adjacent entries of the same type within said array.

20. A method in accordance with claim 13, wherein the number of corresponding entries which differ between pairs of binary bit mask arrays associated with consecutive shades is less than a threshold value for all of said arrays for which data is stored in said bit mask store.

21. A method in accordance with claim 13, wherein said bit mask arrays each comprise an n by m array of entries wherein said identification of an entry in a selected bit mask for a position associated with co-ordinates x, y, comprises identifying an entry at position x modulo n, y modulo m in said selected bit mask.

22. A method in accordance with claim 13, wherein storing data representative of a set of binary bit mask arrays, comprises storing bit mask data for processing items of multi-level data of different shades in the same line of a multi-level image in consecutive memory locations.

23. A method in accordance with claim 22 further comprising counting the number of items of multi-level data in a line of multi-level image data being processed, and outputting as half-tone data for an item of multi-level data, an entry of a binary bit mask array selected utilizing a current value for said counter.

24. A method in accordance with claim 13, further comprising:
- generating data representative of a set of binary bit mask by:
- receiving a plurality of items of run length data;
- generating a binary array of data in which a number of entries of a first type are included for each item of run length data, followed by an entry of another type for each of said items of run length data; and
- for groups of successive binary numbers of said array performing an exclusive or operation for each part of numbers to generate data representative of bit masks arrays.

25. A printing method comprising:
- processing multi-level image data in accordance with claim 13; and
- utilizing said output half-tone data to cause a printer to print an image.

26. A printing system comprising:
- an image processing apparatus in accordance with claim 1; and
- a printer operable to receive output half-tone image data and to record an image corresponding to said received half-tone image data.

27. A printer driver for causing a programmable computer to become configured as an image processing apparatus in accordance with claim 1.

28. A method of generating bit mask arrays comprising:
- storing data representative of a binary array of entries of a first and a second type wherein the entries in said array are distributed so as to maximize a distance function dependent upon the spread of entries of the same type in the bit mask array subject to the entries being arranged such that each entry forms part of a cluster of two or more adjacent entries of the same type within said array or is adjacent to an entry of the same type which forms part of a cluster of entries of the same type in said array, the entries at the edges of a binary bit mask array being adjacent to corresponding entries at the opposite edge of the binary bit mask array;

identifying the amount a distance function is reduced by modifying individual entries of a first type to become entries of said second type;

determining a set of entries of a first type to be considered for modification on the basis of the size of reduction in said distance function arising from modifying individual entries of said first type to become entries of said second type;

sequentially selecting and processing entries in a determined set to determine whether modifying a selected entry to become an entry of said second type would cause said stored array to define an array of entries where at least some entries no longer form part of a cluster of two or more entries of the same type or are entries which are no longer adjacent to a cluster of two or more entries of the same type;

updating said stored array by modifying a selected entry if such modification is not such to cause said stored array to define an array of entries where at least some entries no longer form part of a cluster of two or more entries of the same type or are entries which are no longer adjacent to a cluster of two or more entries of the same type;

determining an alternative modification of a plurality of adjacent entries of said first type including said selected entry which is not such to cause said stored array to define an array of entries where at least some entries no longer form part of a cluster of two or more entries of the same type or are entries which are no longer adjacent to a cluster of two or more entries of the same type if modification of said single entry is such to cause said stored array to define an array of entries where at least some entries no longer form part of a cluster of two or more entries of the same type or are entries which are no longer adjacent to a cluster of two or more entries of the same type; and if it is determined that modifying any individual entries of said selected set of entries of said first type would cause said stored array to define an array of entries where at least some entries no longer form part of a cluster of two or more entries of the same type or are entries which are no longer adjacent to a cluster of two or more entries of the same type, updating said stored array utilizing a determined alternative modification associated with one of said selected set of entries of said first type.

29. A method in accordance with claim 28 wherein each said cluster of two or more adjacent entries of the same type comprises a pair of adjacent entries of the same type within said array.

30. A method in accordance with claim 28 wherein each said cluster of two or more adjacent entries of the same type comprises cluster of three or more adjacent entries of the same type within said array.

31. A method in accordance with claim 30 wherein each said cluster of three or more adjacent entries of the same type comprises two entries comprising entries immediately adjacent a third entry of the same type, wherein said two of said entries comprise entries of said same type at positions immediately vertically adjacent and immediately horizontally adjacent to the position in said array of said third entry of said same type.

32. A method in accordance with claim 28, wherein an entry in said array is determined to be adjacent to an entry of the same type forming part of a cluster of entries of said type if said entry is at a position in said array diagonally adjacent to an entry of the same type forming part of a cluster of entries of the same type.

33. A method in accordance with claim 28 wherein an entry in said array is determined to be adjacent to an entry of the same type forming part of a cluster of entries of said type if said entry is at a position in said array immediately vertically adjacent or immediately horizontally adjacent to an entry of the same type forming part of a cluster of entries of the same type.

34. A method in accordance with claim 28, wherein determining a set of entries of a first type to be considered for modification comprises selecting a set of entries of said first type on the basis of a function indicative of the extent said entries are separated from entries of said second type within said array.

35. A method in accordance with claim 34 wherein said update of said array comprises updating the array utilizing a modification of the array involving the fewest number of modifications of entries of said first type to become entries of said second type wherein said modification is determined to result in the greatest spread of entries of said first type in said array.

36. A method in accordance with claim 35 further comprising associating each of said alternative modifications determined for a set of entries of said first type with a value indicative of the extent the area of an array which is to be modified wherein updating the array comprises selecting a modification result in the greatest spread of one entries in said array associated with a value indicative of smallest area of the array which is being modified.

37. A method in accordance with claim 28 further comprising, after said array has been updated:

sequentially processing each of said entries of said first type by:

modifying said array by setting the entry of said first type being processed to be an entry of said second type and modifying further adjacent entries of said first type until said array comprises an array in which entries are arranged such that each entry forms part of a cluster of two or more adjacent entries of the same type within said array or is adjacent to an entry of the same type which forms part of a cluster of entries of the same type in said array;

modifying entries in said array of said second type where said modifications are such to ensure that said array comprises an array in which entries are arranged such that each entry forms part of a cluster of two or more adjacent entries of the same type within said array or is adjacent to an entry of the same type which forms part of a cluster of entries of the same type in said array until said array includes the same number of entries of said first type prior to modification;

determining whether said modified array comprises an array in which said entries of said first type are more separated from one another than the entries of said first type in the array prior to modification;

after processing all of said entries of said first type, modifying said array utilizing the determined modification associated with the greatest improvement in the spread of entries in said array.

38. A method in accordance with claim 28 wherein said updating of said bit mask is such that the number of entries of said first type in said modified bit mask represented by entries of said second type in the originally stored array does not exceed a preset threshold.

39. A method of generating bit masks in accordance with claim 28, further comprising outputting data defining said updated bit mask array.

40. A non-transitory recording medium storing computer interpretable instructions for causing a programmable computer to become configured as an apparatus in accordance with claim 1.

41. A non-transitory recording medium in accordance with claim 40 comprising a computer disc.

42. A computer disc in accordance with claim 41 comprising a magnetic optical or magneto-optical disc.

\* \* \* \* \*